United States Patent
Livingston et al.

(10) Patent No.: US 10,913,033 B2
(45) Date of Patent: Feb. 9, 2021

(54) PROCESS FOR THE PRODUCTION OF SOLVENT STABLE POLYMERIC MEMBRANES

(71) Applicant: IP2IPO INNOVATIONS LIMITED, London (GB)

(72) Inventors: Andrew Guy Livingston, London (GB); Patrizia Marchetti, London (GB); Piers Gaffney, London (GB); Ruiyi Liu, London (GB)

(73) Assignee: IP2IPO INNOVATIONS LIMITED, London (GB)

(*) Notice: Subject to any disclaimer, the term of this patent is extended or adjusted under 35 U.S.C. 154(b) by 124 days.

(21) Appl. No.: 16/307,220

(22) PCT Filed: Jun. 6, 2017

(86) PCT No.: PCT/GB2017/051633
§ 371 (c)(1),
(2) Date: Dec. 5, 2018

(87) PCT Pub. No.: WO2017/212246
PCT Pub. Date: Dec. 14, 2017

(65) Prior Publication Data
US 2019/0176092 A1     Jun. 13, 2019

(30) Foreign Application Priority Data
Jun. 6, 2016   (GB) .................. 1609873.3

(51) Int. Cl.
*B01D 67/00*   (2006.01)
*B01D 61/02*   (2006.01)
(Continued)

(52) U.S. Cl.
CPC ....... *B01D 67/0016* (2013.01); *B01D 61/027* (2013.01); *B01D 61/145* (2013.01);
(Continued)

(58) Field of Classification Search
CPC ............ B01D 67/0016; B01D 61/027; B01D 61/145; B01D 67/0013; B01D 67/0093; B01D 69/02; B01D 71/62
See application file for complete search history.

(56) References Cited

U.S. PATENT DOCUMENTS

| 2008/0143014 A1* | 6/2008 | Tang ................ B01D 67/0088 264/216 |
| 2010/0038306 A1* | 2/2010 | Livingston ........ B01D 67/0088 210/496 |

(Continued)

FOREIGN PATENT DOCUMENTS

| WO | 2012/010886 A1 | 1/2012 |
| WO | 2012/010889 A1 | 1/2012 |
| WO | 2016/020708 A1 | 2/2016 |

OTHER PUBLICATIONS

Fei et al., Robust Covalently Cross-linked Polybenzimidazole/Graphene Oxide Membranes for High-Flux Organic Solvent Nanofiltration. ACS Appl Mater Interfaces. May 9, 2018;10(18):16140-16147.

(Continued)

*Primary Examiner* — Ellen M McAvoy
(74) *Attorney, Agent, or Firm* — McCarter & English, LLP; Steven G. Davis; Wei Song

(57) ABSTRACT

The present invention relates to a process for preparing an asymmetric integrally skinned membrane for the separation of at least one solute from a solution, comprising the steps of: (a) preparing a polybenzimidazole dope solution comprising: (i) a polybenzimidazole polymer, and (ii) a solvent system for said polybenzimidazole which is water miscible; (b) casting a film of said dope solution onto a support; (c) immersing the film cast on the support into a coagulating medium to form an asymmetric integrally skinned membrane; (d) treating the membrane from step (c) with a
(Continued)

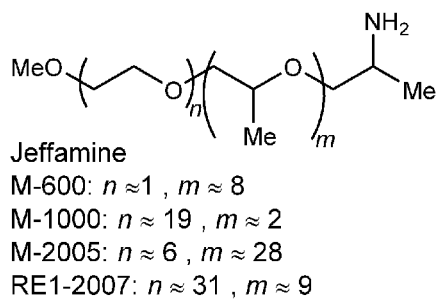

Jeffamine
M-600: n ≈ 1, m ≈ 8
M-1000: n ≈ 19, m ≈ 2
M-2005: n ≈ 6, m ≈ 28
RE1-2007: n ≈ 31, m ≈ 9

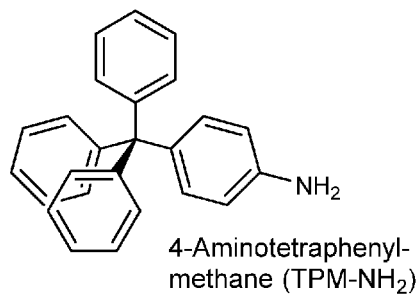

4-Aminotetraphenyl-methane (TPM-NH₂)

XTJ-436 cross-linking agent; (e) treating the membrane from step (d) with a cross-link modification agent. Further aspects relate to an asymmetric integrally skinned membrane and uses thereof.

15 Claims, 16 Drawing Sheets

(51) Int. Cl.
  *B01D 61/14* (2006.01)
  *B01D 69/02* (2006.01)
  *B01D 71/62* (2006.01)
(52) U.S. Cl.
  CPC ..... *B01D 67/0013* (2013.01); *B01D 67/0093* (2013.01); *B01D 69/02* (2013.01); *B01D 71/62* (2013.01); *B01D 2323/30* (2013.01); *B01D 2325/022* (2013.01); *B01D 2325/28* (2013.01); *B01D 2325/30* (2013.01)

(56) References Cited

U.S. PATENT DOCUMENTS

| | | | | |
|---|---|---|---|---|
| 2013/0112619 A1* | 5/2013 | Livingston | ............ | B01D 71/56 210/644 |
| 2013/0118983 A1* | 5/2013 | Livingston | ............ | B01D 69/02 210/654 |
| 2013/0313192 A1* | 11/2013 | Wang | ............ | B01D 61/366 210/640 |
| 2014/0251897 A1* | 9/2014 | Livingston | ............ | B01D 69/125 210/500.33 |
| 2017/0007963 A1* | 1/2017 | Livingston | ............ | B01D 67/0011 |

OTHER PUBLICATIONS

Valtcheva et al., Crosslinked polybenzimidazole membranes for organic solvent nanofiltration (OSN): Analysis of crosslinking reaction mechanism and effects of reaction parameters. Journal of Membrane Science. 2015;493:568-579.

Zhao et al., Bio-Inspired Robust Membranes Nanoengineered from Interpenetrating Polymer Networks of Polybenzimidazole/Polydopamine ACS Nano. Jan. 22, 2019;13(1):125-133.

Siddique et al., Pore preserving crosslinkers for polyimide OSN membranes. Journal of Membrane Science. Sep. 1, 2014;465:138-150.

Valtcheva et al., Beyond polyimide: Crosslinked polybenzimidazole membranes for organic solvent nanofiltration (OSN) in harsh environments. Journal of Membrane Science. May 1, 2014;457:62-72.

Great Britain Search Report for Application No. GB1609873.3, dated Dec. 21, 2016, 6 pages.

International Search Report and Written Opinion for Application No. PCT/GB2017/051633, dated Aug. 30, 2017, 16 pages.

* cited by examiner

PROCESS FOR THE PRODUCTION OF SOLVENT STABLE POLYMERIC MEMBRANES

CROSS-REFERENCE TO RELATED APPLICATIONS

This application is a U.S. national stage filing, under 35 U.S.C. § 371(c), of International Application No. PCT/GB2017/051633, filed on Jun. 6, 2017, which claims priority to United Kingdom Application No. 1609873.3, filed on Jun. 6, 2016. The entire contents of each of the aforementioned applications are incorporated herein by reference.

INTRODUCTION

The present invention relates to membranes suitable for use in separation processes such as ultrafiltration and nanofiltration. The membranes of the present invention are suitable for separating at least one solute from a solution.

BACKGROUND OF THE INVENTION

Membrane processes are well known in the art of separation science, and can be applied to a range of separations of species of varying molecular weights in liquid and gas phases (see for example "Membrane Technology and Applications" $2^{nd}$ Edition, R. W. Baker, John Wiley and Sons Ltd, ISBN 0-470-85445-6).

Nanofiltration is a membrane process utilising membranes with pore sizes generally in the range 0.5-5 nm, and which have molecular weight cut-offs in the region of about 200-5,000 g·mol$^{-1}$.

Ultrafiltration is a membrane process utilising membranes with pore sizes generally in the range of 0.01 to 0.1 μm, and which have molecular weight cut-offs in the region of about 3000 to about 100,000 g·mol$^{-1}$.

Molecular weight cut-off of a membrane is generally defined as the molecular weight of a molecule that would exhibit a rejection of 90% when subjected to filtration by the membrane.

Ultrafiltration and nanofiltration have been widely applied to the filtration of aqueous fluids, but due to a lack of suitable solvent stable membranes they have not been widely applied to the separation of solutes in organic solvents. This is despite the fact that organic solvent filtration has many potential applications in the manufacturing industry including solvent exchange, catalyst recovery and recycling, purifications, and concentrations. U.S. Pat. Nos. 5,174,899 5,215,667; 5,288,818; 5,298,669 and 5,395,979 disclose the separation of organometallic compounds and/or metal carbonyls from their solutions in organic media. UK Patent No. GB 2,373,743 describes the application of organic solvent nanofiltration to solvent exchange and UK Patent No. GB 2,369,311 describes the application of organic solvent nanofiltration to recycle of phase transfer agents. WO 2004/055037 describes the application of organic solvent nanofiltration to the separation of synthons during oligonucleotide synthesis, and U.S. Pat. No. 8,664,357 describes the use of organic solvent nanofiltration in diafiltration of peptides, peptide nucleic acids or oligonucleotides, while WO 2011/148177, WO 2016/020696, and WO 2016/020708 describe the use of organic solvent nanofiltration in polymer synthesis.

Polybenzimidazole (PBI) membranes have been widely reported for use in gas separations and processing of aqueous fluids. U.S. Pat. Nos. 3,699,038, 3,720,607, 3,841,492, 4,448,687 and 4,693,824 report the formation of integrally skinned polybenzimidazole membranes formed by phase inversion from a dope solution. U.S. Pat. No. 3,737,402 reports the formation of polybenzimidazole membranes by phase inversion from a dope solution, followed by annealing at temperatures of at least 135° C. to improve the reverse osmosis performance of the membranes. U.S. Pat. No. 4,693,825 reports the production of polybenzimidazole membranes from a dope solution containing benzyl alcohol as an additive. It has been reported that cross-linking of PBI membranes improves their chemical resistance. U.S. Pat. Nos. 4,666,996, 6,986,844, 4,734,466, and 4,020,142 all disclose methods for the cross-linking PBI. However, these methods are known to lead to a dramatic increase in the brittleness of the membranes, making them difficult to manufacture and use.

AU 2011281326 discloses a method for making PBI membranes which includes cross-linking the membranes and then treating them with a bath that contains a non-reactive conditioning agent to avoid the membranes becoming brittle. Further disclosures of PBI membranes cross-linked and treated with a non-reactive conditioning agent are made in the literature by I Valtcheva. S C Kumbharkar, J F Kim, Y Bhole, and A G Livingston, "Beyond Polymide: Cross-linked Polybenzimidazole Membranes for Organic Solvent Nanofiltration (OSN) in Harsh Environments", J. Mem. Sci (2014) 457 pp. 62-72 and I. Valtcheva, P. Marchetti and A. G. Livingston "Cross-linked polybenzimidazole membranes for organic solvent nanofiltration (OSN): Analysis of cross-linking reaction mechanism and effects of reaction parameters", J. Mem. Sci. (2015) 493 pp 568-579. WO 2012/010886 describes PBI membranes and their use in nanofiltration.

There is a need in the art for further/improved membranes suitable for use in separation processes such as nanofiltration and ultrafiltration. Preferably, said membranes would be tuneable for permeance and rejection and have improved consistency of performance.

SUMMARY OF THE INVENTION

In a first aspect, the present invention relates to a process for preparing an asymmetric integrally skinned membrane for the separation of at least one solute from a solution, comprising the steps of:
(a) preparing a polybenzimidazole dope solution comprising:
    (i) a polybenzimidazole polymer, and
    (ii) a solvent system for said polybenzimidazole which is water miscible;
(b) casting a film of said dope solution onto a support;
(c) immersing the film cast on the support into a coagulating medium to form an asymmetric integrally skinned membrane;
(d) treating the membrane from step (c) with a cross-linking agent;
(e) treating the membrane from step (d) with a cross-link modification agent.

In a second aspect, the present invention relates to an asymmetric integrally skinned membrane obtainable/obtained by the process of the first aspect.

In a third aspect, the present invention relates to an asymmetric integrally skinned membrane for the separation of at least one solute from a solution wherein the membrane comprises a cross-linked polybenzimidazole polymer wherein the polymer comprises a cross-link modifier.

In a fourth aspect, the present invention relates to the use of an asymmetric integrally skinned membrane according to the second or third aspect for filtration of a solution comprising at least one solute.

Membranes of the invention can be used for filtration (e.g. ultrafiltration, nanofiltration) processes, in particular processes involving organic solvents. In particular, they can be used for filtration processes in solvents in which the polybenzimidazole polymer on which the membrane is based is soluble. This is advantageous with respect to many of the prior art membranes, which lose structure and dissolve in typical dope solvents such as dimethylacetamide (DMAc), and exhibit low or no flux in some chlorinated solvents such as dichloromethane.

Further, the membranes of the present invention can be employed in a feed stream solution in which the solution is strongly acidic or basic, or in which the feed stream solution contains components which are strongly acidic or basic. This is advantageous with respect to the prior art membranes, which lose structure and dissolve under strongly acidic or basic conditions. The membranes of the present invention however are stable in these solvents, offering acceptable permeance and rejections.

Yet a further advantage of the membranes of the present invention is that they may exhibit higher permeance than known membranes when mixtures of water and organic solvent are being processed.

Yet a further advantage of the membranes of the present invention is that residual functional groups from the cross-linking agent are passivated by reaction with the cross-link modification agent.

Yet a further advantage of the membranes of the present invention is that they demonstrate consistent performance over time.

Yet a further advantage of the membranes of the present invention is that the cross-link modification agent may be chosen to alter the properties of the membrane so as to modulate permeance and/or rejection of the membrane.

DETAILED DESCRIPTION OF THE INVENTION

Process

Figure 1:
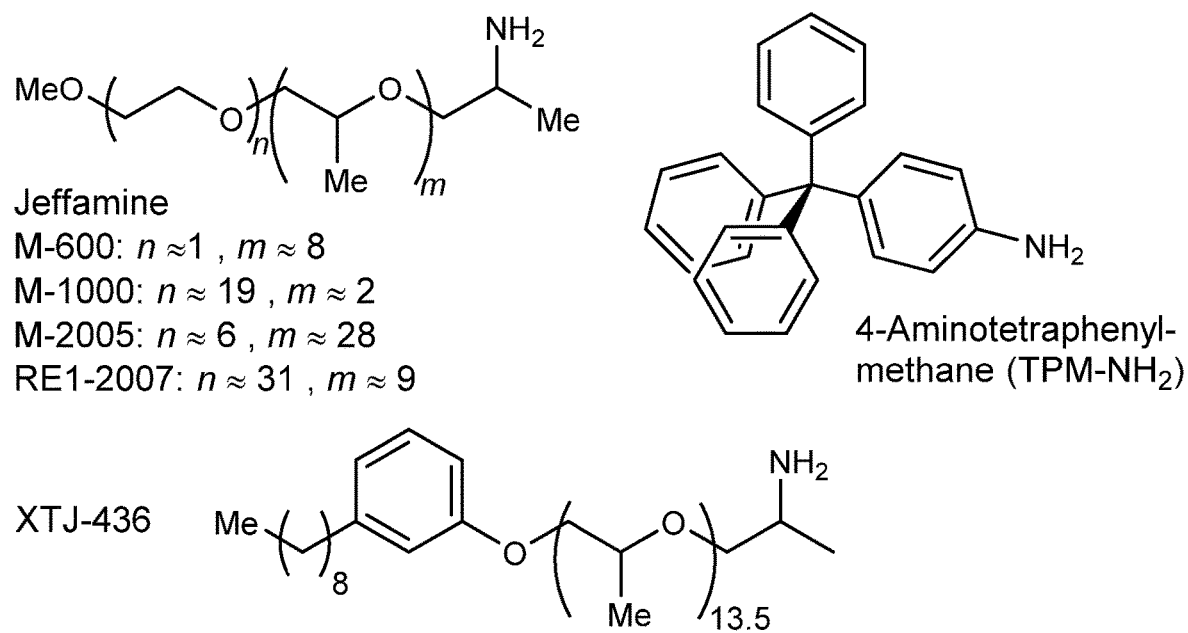
FIG. 1 shows some cross-link modification agents which have been employed in the examples.

Membranes can be made by dissolving polybenzimidazole (PBI) polymer in a solvent system together with optional viscosity enhancers, optional void suppressors, and optionally discrete particles of an immiscible matrix, to give a polymer dope solution, casting the solution upon a support to form a film, optionally partially evaporating the solvent, and quenching the film e.g. in water. This precipitates the polymer and forms an asymmetric membrane by a phase inversion process.

In one aspect, the present invention provides a process for preparing an asymmetric integrally skinned membrane for the separation of at least one solute from a solution, comprising the steps of:
(a) preparing a polybenzimidazole dope solution comprising:
  (i) a polybenzimidazole polymer, and
  (ii) a solvent system for said polybenzimidazole which is water miscible;
(b) casting a film of said dope solution onto a support;
(c) immersing the film cast on the substrate into a coagulating medium to form an asymmetric integrally skinned membrane;
(d) treating the membrane from step (c) with a cross-linking agent;
(e) treating the membrane from step (d) with a cross-link modification agent.

In one embodiment, the polybenzimidazole polymer dope solution may be prepared by dissolving a polybenzimidazole polymer in a solvent system comprising one or more solvents. In one embodiment, the one or more solvents are selected from the following water-miscible solvents: N,N-dimethylacetamide, also referred to as DMAc, N-methyl-2-pyrrolidone, hereinafter referred to as NMP, tetrahydrofuran, hereinafter referred to as THF, N,N-dimethylformamide, hereinafter referred to as DMF, dimethylsulfoxide, 1,4-dioxane, gamma-butyrolactone, water, alcohols, ketones, and formamide.

In one embodiment, the solvent system comprises/essentially consists of/consists of DMAc.

The weight percent of the polybenzimidazole polymer in the dope solution may range from about 5% to about 30%. In another embodiment, the polybenzimidazole polymer in the dope solution may range from about 12 wt % to about 24 wt %, for example about 14 wt % to about 20 wt %.

Suitable polybenzimidazole polymers are presented in the prior art, including U.S. Pat. Nos. 3,699,038, 3,720,607, 3,737,402, 3,841,492, 4,448,687, 4,693,824 and 4,693,825, each incorporated herein by reference.

Processes for producing suitable polybenzimidazoles are known to those skilled in the art and include those described in U.S. Pat. No. 2,895,948, U.S. Pat. No. Re 26,065, U.S. Pat. Nos. 3,313,783, 3,509,108, 3,555,389, 3,433,772, 3,408,336, 3,549,603, 3,708,439, 4,154,919, 4,312,976, 5,410,012, 5,554,715, AU 2011281326, and in the Journal of Polymer Science, Vol 50, pages 511-539 (1961), each incorporated herein by reference.

In one embodiment, the polybenzimidazole polymer has the following general repeat structure (I) shown below:

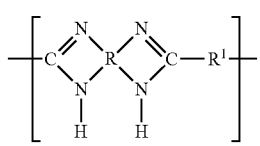

(I)

where R is a tetravalent aromatic nucleus, typically symmetrically substituted, with the nitrogen atoms forming the benzimidazole rings being paired upon adjacent carbon atoms of the aromatic nucleus, and $R^1$ is a divalent substituent selected from aliphatic, alicyclic and aromatic radicals.

Suitably, the R group in the general repeat structure (I) shown above has the structure (II) shown below:

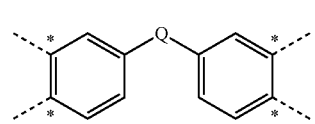

(II)

wherein Q is a direct bond between the adjacent rings or an alkylene linker and * marks the point of attachment with the N atoms of the fused imidazole rings.

In an embodiment, Q is a direct bond.

The $R^1$ substituents in the general repeat structure I can include (1) an aromatic ring, (2) an arylene group, (3) an alkylene group, (4) an arylene-ether group, and (5) a heterocyclic ring. A suitable example of an aromatic ring is phenyl. A suitable example of an arylene group is phenylene. The term "alkylene group" includes (1-20C) alkylene groups. In an embodiment, an alkylene group is a (1-6C) alkylene group. An arylene-ether group is suitably a group of the general formula (III):

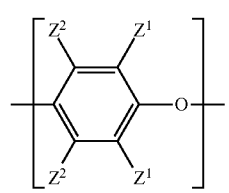

(III)

wherein each $Z^1$ or $Z^2$ group is hydrogen or a hydrocarbyl substituent group (suitably a 1-6C hydrocarbyl group). When $R^1$ is a heterocyclic ring, it is suitably a saturated, unsaturated or partially saturated monocyclic or bicyclic ring containing 4 to 12 atoms of which 1, 2, 3 or 4 ring atoms are chosen from nitrogen, sulphur or oxygen, which ring may be carbon or nitrogen linked, wherein a —$CH_2$— group can optionally be replaced by a —C(O)—; and wherein a ring nitrogen or sulphur atom is optionally oxidised to form the N-oxide or S-oxide(s). Particular examples of heterocyclic rings include pyridine, pyrazine, furan, quinoline, thiophene, or pyran.

A further preferred class of polybenzimidazole polymers useful to prepare the membranes of the invention has the following general repeat structure (IV) shown below:

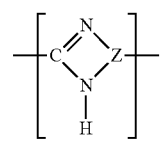

(IV)

where Z is an aromatic nucleus having the nitrogen atoms forming the benzimidazole ring paired upon adjacent carbon atoms of the aromatic nucleus. Further polybenzimidazole polymers useful in the invention are mixtures of polymers with structure (I) and polymers with structure (IV).

Suitably Z is a fused phenyl ring.

In one embodiment, the polybenzimidazole polymer is poly(2,2'-[m-phenylene])-5,5'-bis-benzimidazole which has the formula shown below:

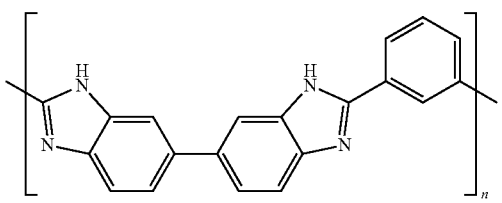

wherein n is an integer.

Suitably, n is an integer within the range of 10 to 5000, more typically 20 to 3000 and even more typically 50 to 2000.

In one embodiment, the dope solution may comprise additives, such as viscosity enhancers. Viscosity enhancers may be present in amounts up to about 10% by weight of the said polybenzimidazole polymer dope solution and these include polyvinyl pyrrolidones, polyethylene glycols and urethanes.

In another embodiment, additives such as void suppressors may be used in amounts up to 5% of the weight of said polybenzimidazole polymer dope solution. An example of a suitable void suppressor is maleic acid.

Additives such as surfactants, which influence the pore structure, may be used in amounts up to 5% of the weight of said polybenzimidazole polymer dope solution. Examples of suitable surfactants include Triton X-100 (octylphenoxy-polyethoxyethanol; available from Sigma-Aldrich UK Ltd.).

In another embodiment, the dope solution may comprise a stabiliser (e.g. lithium chloride).

Organic or inorganic matrices in the form of powdered solids may be present at amounts up to 20 wt % of the said polymer dope solution. Suitable matrices include carbon molecular sieve matrices which can be prepared by pyrolysis of any suitable material as described in U.S. Pat. No. 6,585,802. Furthermore, graphene or graphene oxide flakes, or 2-D carbon flakes as described in UK Patent Application 1510761.8 may be added to the polymer dope solution. Zeolites as described in U.S. Pat. No. 6,755,900 may also be used as an inorganic matrix. Metal oxides, such as titanium dioxide, zinc oxide and silicon dioxide may be used, for example the materials available from Evonik Degussa AG (Germany) under their Aerosol and AdNano trademarks. Mixed metal oxides such as mixtures of cerium, zirconium, and magnesium may be used.

In one embodiment, the matrices will have particles less than about 1.0 micron in diameter, preferably less than about 0.1 microns in diameter, and more preferably less than about 0.01 microns in diameter. In some cases it may be advantageous to disperse the matrices in a separate solution from the dope solution, preferably an organic solvent solution, and then subsequently add this solution to the dope solution containing the polymer. In a preferred embodiment crystals or nanoparticles of an inorganic matrix, for example zeolites or metal oxides, may be grown to a selected size in a separate solution from the dope solution, and this dispersion solution subsequently added to the dope solution containing the polymer. This separate solution may comprise/consist of water or an organic solvent with nanoparticles dispersed in the continuous liquid phase. In yet a further preferred embodiment, the solvent in which the matrix is dispersed may be volatile, and it may be removed from the dope solution prior to membrane casting by evaporation.

Once the polybenzimidazole polymer is dissolved in the solvent system described, and optionally organic or inorganic matrices are added into the dope solution so that the matrices are well dispersed, it is cast onto a suitable support.

The support can take the form of an inert porous material which does not hinder the passage of permeate through the membrane and does not react with the membrane material, the casting solution, the gelation bath solvent, or the solvents which the membrane will be permeating in use.

In one embodiment, the support is selected from a metal mesh, sintered metal, porous ceramic, sintered glass, paper, porous nondissolved plastic, and woven or non-woven material.

In another embodiment, the support is a non-woven polymeric material, such as a polyester, polyethylene, polypropylene, polyetherether ketone (PEEK), polyphenylene sulphide (PPS), Ethylene-ChloroTriFluoroEthylene (Halar® ECTFE), or carbon fibre material.

Optionally, following the casting step (b), a portion of the solvent may be evaporated (i.e. the solvent is partially evaporated) under conditions sufficient to produce a dense, ultra-thin, top "skin" layer on the polybenzimidazole membrane.

Suitable conditions for partial evaporation would be known to a person skilled in the art. In one embodiment, the cast dope solution is evaporated by exposure to air for a duration of less than about 100 seconds, suitably less than about 30 seconds.

In another embodiment, air is blown over the surface at about 15° C. to about 25° C. for a duration of less than about 30 seconds.

In one embodiment, the coagulating or quenching medium may comprise/consist of one or more water, alcohol, ketones. In another embodiment, the coagulating medium may further comprise additives such as surfactants, e.g. Triton® X-100 (octylphenoxy-polyethoxyethanol; available from Sigma-Aldrich UK Ltd.). The conditions for effecting coagulation are well known to those skilled in the art.

In one embodiment, the coagulating medium comprises/essentially consists of/consists of water.

The resultant asymmetric polybenzimidazole membranes formed can be washed according to the following techniques. Typically water-soluble organic compounds, such as low molecular weight alcohols and ketones including but not limited to methanol, ethanol, isopropanol, acetone, methylethyl ketone or mixtures thereof and blends with water can be used for removing the residual casting solvent (e.g. DMAc) from the membrane. Alternatively the membrane may be washed with water. Removal of the residual casting solvent may require successive wash blends in a sequential solvent exchange process. Both membrane efficiency (solute rejection) and permeate flow rate can be enhanced by the proper solvent exchange process.

The membranes are then treated with a cross-linking agent. As used herein, the term "cross-linking agent" refers to a chemical compound capable of bonding with adjacent polymer chains to form a cross-link between polymer chains. Accordingly, in one embodiment the cross-linking agent is at least difunctionalised.

Suitable cross-linking agents are described in U.S. Pat. Nos. 4,666,996, 6,986,844, 4,734,466, and 4,020,142, all of which are incorporated herein by reference.

In one embodiment, the cross-linking agent comprises an electrophilic functional group.

In another embodiment, the cross-linking agent is a multifunctional halide, multifunctional sulfonate ester or a divinyl sulfone.

As used herein, the term "multifunctional" means that two or more functional groups are present. For example 2, 3 or 4 or more functional groups, suitably 2, 3 or 4 functional groups.

In one embodiment, the multifunctional halide is a multifunctional alkyl halide. Multifunctional alkyl halides include two or more halide substituents. In one embodiment, the multifunctional alkyl halide has two, three or four halide substituents.

In one embodiment, the cross-linking agent is of general structure (V):

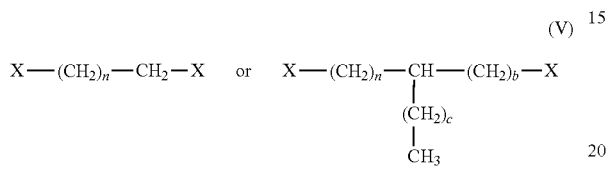

where X is Br or Cl, n is 1 to 11, a is 1 to 10, b is 0 to 4, and c is 0 to 6.

In one embodiment, the cross-linking agent is a difunctional alkyl halides comprising a straight alkyl chain and terminally di-functionalised having the structure X—$(CH_2)_n CH_2$—X where X and n are as defined above. In one embodiment, the difunctional alkyl halide is dibromobutane (DBB).

In another embodiment, the alkyl halide may contain three or more halide substituents. Exemplary alkyl halides with three or more halide substituents include tribromopropane, trichloropropane, pentaerythrityl tetrabromide, and pentaerythrityl tetrachloride.

Further suitable cross-linking agents include divinylsulfones with the general formula (VI):

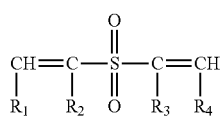

wherein each of $R_1$-$R_4$ is the same or different and is selected from H or $C_1$-$C_3$ alkyl.

In one embodiment the cross-linking agent is divinyl sulfone:

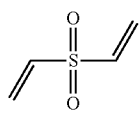

In another embodiment, the cross-linking agent is an unsubstituted or substituted dibenzylhalide. For instance, an unsubstituted or substituted compound of general structure, A, B, C, D or E:

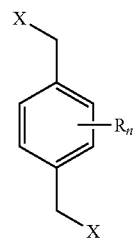

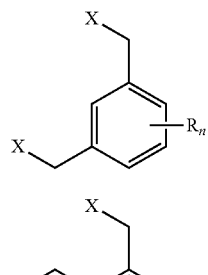

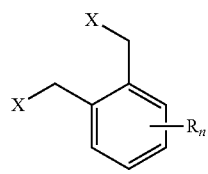

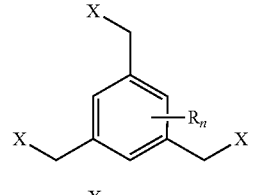

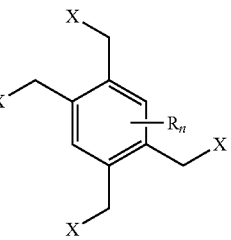

wherein X is Cl or Br, R is selected from H or $C_1$-$C_3$ alkyl, halo, $C_1$-$C_3$ alkoxy, and n is 0, 1, 2, 3 or 4.

In one embodiment, the cross-linking agent is of general structure A. In a further embodiment, the cross-linking agent is of general structure A and n=0.

In one embodiment, the polymer is cross-linked with a cross-linking agent which is α,α'-dibromo-p-xylene.

In another embodiment, the cross-linking agent is selected from dibromoxylene, dibromobutane, tribromopropane, trichloropropane, pentaerythrityl tetrabromide, pentaerythrityl tetrachloride, divinyl sulfone, 1,3,5-tri(bromomethyl)benzene, and 1,2,4,5-tetra(bromomethyl)benzene.

In another embodiment, the cross-linking agent is selected from dibromoxylene, dibromobutane, tribromopropane, trichloropropane, pentaerythrityl tetrabromide, pentaerythrityl tetrachloride, and divinyl sulfone, In one embodiment, the cross-linking agent is dissolved in a solvent in order to treat the membrane. In one embodiment, the solvent may be selected from acetonitrile, toluene, acetone, methyl isobutyl ketone (MIBK), methyl ethyl ketone (MEK), pentanone, isopropyl ether and butyl ether.

In one embodiment, when the cross-linking agent is a divinylsulfone, the solvent used to dissolve the cross-linking agent may optionally also comprise a strong base catalyst, including metal hydroxides such as sodium and potassium hydroxide, metal alkoxides having from one to six alkyl carbon atoms such as sodium methoxide, sodium ethoxide, and alkyl aryl amine hydroxides such as particularly preferred benzyl trimethyl ammonium hydroxide. The base catalyst is generally added in amounts ranging from about 5 percent to 150 percent based upon the total weight of the divinylsulfone which is added. The preferred range is about 25 to about 50 percent by weight.

The concentration of cross-linking agent can be adjusted with respect to the quantity of membrane, in order to control the extent of cross-linking that takes place, so that the ratio between reactive groups in the cross-linking agent and polybenzimidazole amine hydrogen groups in the membrane treated is in the range of about 0.01 to about 100, suitably in the range of about 0.01 to about 10, for example in the range of about 0.1 to about 5.

In one embodiment, the concentration of cross-linking agent added is from about 0.1 wt % to 20 wt % relative to the weight of the membrane, for example in the range of about 0.5 wt. % to about 10 wt. %, for example in the range of about 0.5 wt. % to about 5 wt. %, for example in the range of about 1 wt. % to about 5 wt. %.

The reaction time for cross-linking can be between about 0.01 and about 120 hours, for example between about 0.5 and about 60 hours. The temperature of the cross-linking reaction can be varied between about 0° C. and the boiling point of the solvent. In one embodiment, the membrane is treated with cross-linking agent at a temperature of between about 0° C. and about 150° C., for example between about 50° C. and about 120° C.

It is understood by those skilled in the art that a fraction of the cross-linking agent will react fully with the polybenzimidazole so that the resulting membrane will have some cross-links between polymer chains and a fraction of cross-linking agent molecules will react incompletely with the polymer chains such that at least one functional group is attached to the polybenzimidazole polymer chain, and at least one functional group is unreacted and pendant to the polymer chain as a residual functional group.

The membrane is then treated with a cross-link modification agent.

As used herein the term "cross-link modification agent" refers to a chemical compound capable of reacting with unreacted functional group(s) of the cross-linking agent.

In one embodiment, the cross-link modification agent is an organic molecule which comprises at least one functional group that will undergo reaction with residual functional groups of the cross-linking agent. In one embodiment, the cross-link modification agent has only one functional group capable of reacting with the cross-linking agent. Accordingly, in one embodiment, the cross-link modification agent is mono-functional.

In another embodiment, the cross-link modification agent comprises a functional group capable of reacting with a functional group on the cross-linking agent which has not completely reacted with the polybenzimidazole polymer.

In another embodiment, the cross-link modification agent comprises a functional group capable of reacting with an electrophilic functional group on the cross-linking agent.

In another embodiment, the cross-link modification agent comprises a functional group capable of reacting with an alkyl halide, benzyl halide or a vinyl sulfone group in the cross-linking agent.

In another embodiment, the cross-link modification agent comprises a functional group capable of reacting with a benzyl halide or a vinyl sulfone group in the cross-linking agent.

In another embodiment, the cross-link modification agent comprises a nucleophilic functional group. In another embodiment, the cross-link modification agent comprises only one nucleophilic functional group.

In another embodiment, the cross-link modification agent comprises a functional group selected from an amine, a thiol, a thiolate, a phenoxide, a hydroxide, a carboxylate, a sulphonate, a phosphonate, a phosphate, a hydroxylamine, an oximate, a hydrazine, a hydrazone, an imide and a hydrazide.

In another embodiment, the cross-link modification agent comprises a functional group selected from an amine, a thiol, a thiolate, a phenoxide, a hydroxide, a carboxylate, a hydroxylamine, an oximate, a hydrazine, a hydrazone, an imide and a hydrazide.

In another embodiment, the cross-link modification agent comprises a single functional group selected from an amine, a thiol, a thiolate, a phenoxide, a hydroxide, a carboxylate, a hydroxylamine, an oximate, a hydrazine, a hydrazone, an imide and a hydrazide. Suitably, in one embodiment, the cross-link modification agent comprises a single functional group which is an amine.

In another embodiment, the cross-link modification agent comprises an amine. In another embodiment, the cross-link modification agent is an amine. In one embodiment, the cross-link modification agent is a monoamine. In one embodiment, the cross-link modification agent is a polyamine, for example m-phenylene diamine, trypticine triamine, and piperazine.

In another embodiment, the cross-link modification agent is selected from alkyl or dialkyl amines, amino steroids, amino glycosides, amino acids, polyaminoacids, amino lipids, amino aromatic and heteroaromatic nuclei, carboxylate, sulfonate, phosphate and phosphonate salts.

In another embodiment, the cross-link modification agent is selected from alkyl or dialkyl amines, amino steroids, amino glycosides, amino acids, polyaminoacids, amino lipids, amino aromatic and heteroaromatic nuclei.

In another embodiment, the cross-link modification agent is selected from $C_{1-6}$ alkyl or $C_{2-12}$ dialkyl amine. In one embodiment, the cross-link modification is agent is selected from methylamine, ethylamine, dimethylamine and diethylamine.

In another embodiment, the cross-link modification agent is selected from a polyetheramine. In another embodiment, the cross-link modification agent is a polyether monoamine (e.g. Jeffamine 6 M-600, M-1000, M-2005, XTJ-436).

In another embodiment, the cross-link modification agent is selected from a polyetheramine (e.g. Jeffamines®), 4-amino-tetraphenylmethane, polyethylene imine, phosphatidyl ethanaolamine, sphingosine, and 3-aminopropyl trimethoxysilane m-phenylene diamine, trypticine triamine, and piperazine.

In another embodiment, the cross-link modification agent is selected from a polyetheramine (e.g. Jeffamines®), 4-amino-tetraphenylmethane, polyethylene imine, phosphatidyl ethanolamine, sphingosine, and 3-aminopropyl trimethoxysilane.

In another embodiment, the cross-link modification agent is selected from a polyetheraine (e.g. Jeffamines®) and 4-amino-tetraphenylmethane.

In another embodiment, the cross-link modification agent comprises a thiolate or a thiol group.

In another embodiment, the cross-link modification agent is a cysteine derivatives or an alkyl thiol. In another embodiment, the cross-link modification agent is a $C_{1-6}$ alkyl thiol.

In another embodiment, the cross-link modification agent is selected from methylamine, ethylamine, dimethylamine, diethylamine, ethanolamine, aniline, alanine, glycine, ammonia, hydroxylamine, hydrazine, hydrogen peroxide, hydrogen sulphide, 2-mercaptoethanol, 2-mercaptoacetic acid, 3-mercaptopropionic acid, and 3-mercaptopropane sulfonate salts.

In one embodiment, the cross-link modification agent is added in molar excess relative to the cross-linked membrane. In another embodiment, the cross-link modification agent is added in a concentration of from about 1 to about 50 wt. % relative to the weight of the cross-linked membrane. Suitably, the cross-link modification agent is added in a concentration of from about 10 to about 50 wt. % relative to the cross-linked membrane; for example, from about 20 to about 50 wt. % relative to the cross-linked membrane; for example, from about 20 to about 40 wt. % relative to the cross-linked membrane; for example, from about 30 to about 40 wt. % relative to the cross-linked membrane.

In one embodiment, the cross-link modification agent is dissolved in a solvent in order to treat the membrane. In one embodiment, the solvent is selected from acetonitrile, THF, alcohols, ketones, aromatics, hydrocarbons, or mixtures thereof.

Optionally the membrane is treated more than once with a cross-link modification agent. In one embodiment, the second cross-link modification agent differs from the cross-link modification agent of the first treatment. In one embodiment, the cross-link modification agent employed in a second treatment is selected from a small molecule nucleophile. In one embodiment, the small molecule nucleophile is selected from amines, hydroxide salts, carboxylate (e.g. formate, acetate, propionate, benzoate) salts, and phenoxide salts. In another embodiment, the small molecule nucleophile is selected from methylamine, ethylamine, dimethylamine, diethylamine, ethanolamine, aniline, alanine, glycine, ammonia, hydroxylamine, hydrazine, hydrogen peroxide, hydrogen sulphide, 2-mercaptoethanol, 2-mercaptoacetic acid, 3-mercaptopropionic acid, and 3-mercaptopropane sulfonate salts.

Optionally the membrane is then conditioned by contacting the membrane with a non-reactive conditioning agent dissolved in a solvent to impregnate the membrane. Accordingly, in one embodiment the membranes may be treated with a non-reactive conditioning agent as a further step (f) following step (e).

In one embodiment, the non-reactive conditioning agent is a non-volatile organic liquid. As used herein, the term "non-volatile" means that the non-reactive conditioning agent has negligible volatility at the temperature at which the membrane is dried and/or stored. Typically, the non-reactive conditioning agent has negligible volatility at ambient temperature (e.g. a temperature in the range of 0 to 40° C.) and at normal atmospheric pressure (e.g. about 101 KPa).

In one embodiment, the non-reactive conditioning agent may be chosen from synthetic oils (e.g. polyolefinic oils, silicone oils, polyalphaolefinic oils, polyisobutylene oils, synthetic wax isomerate oils, ester oils and alkyl aromatic oils), mineral oils (including solvent refined oils and hydro-processed mineral oils and petroleum wax isomerate oils), vegetable fats and oils, higher alcohols (such as decanol, dodecanol, heptadecanol), glycerols, and glycols or derivatives thereof (such as polypropylene glycols, polyethylene glycols, polyalkylene glycols or derivatives thereof).

Suitable solvents for dissolving the conditioning agent include alcohols, ketones, aromatics, hydrocarbons, or mixtures thereof.

The use of a non-reactive conditioning agent in accordance with the invention allows a suitable pore structure to be maintained in a dry state, and produces a flat sheet membrane with improved flexibility and handling characteristics (relative to the unconditioned membrane).

Prior to use, the non-reactive conditioning agent must be flushed from the membrane, i.e. the non-reactive conditioning agent of this invention serves the purpose of maintaining the desired membrane structure to preserve the performance characteristics when the membrane is in the dry state, and it is not a component of the functional membrane when the membrane is used for the purpose of solvent filtration. This contrasts with the cross-link modification agent which once reacted with a pendant functional group of the polymer is a part of the functional membrane and remains in the membrane due to the bond formed with the pendant functional group of the cross-linking agent.

Following treatment with the cross-link modification agent, or optionally the non-reactive conditioning agent, the membrane is typically dried in air at ambient conditions to remove residual solvent. Accordingly, in one embodiment, the membranes may be dried as a further step (g) following step (f) or (e).

Heat treatment may also be used to increase the membrane rejection of solutes. The membrane may be heated to between about 150° C. and about 300° C. for between about 1 minute and about 2 hours.

In another aspect, the present invention relates to an asymmetric integrally skinned membrane obtainable/obtained by the process of the invention. In one embodiment, the membrane is obtainable/obtained by any embodiment of the process of the invention described above.

Membrane

In one aspect, the present invention relates to an asymmetric integrally skinned membrane for the separation of at least one solute from a solution wherein the membrane comprises a cross-linked polybenzimidazole polymer wherein the polymer comprises a cross-link modifier.

In one embodiment, the membrane essentially consists of/consists of a cross-linked polybenzimidazole polymer wherein the polymer comprises a cross-link modifier.

In one embodiment, the membrane is an asymmetric membrane. Asymmetric membranes will be familiar to one of skill in this art and include an entity composed of a dense ultra-thin top "skin" layer over a thicker porous substructure of the same material, i.e. as being integrally skinned. Accordingly, in one embodiment, the membrane is an asymmetric integrally skinned membrane.

Typically, the membrane is supported on a suitable porous backing or support material.

In one embodiment, the membrane is an ultrafiltration membrane.

In one embodiment, the membrane is a nanofiltration membrane.

"Nanofiltration" is a process known to the skilled person. Broadly, it is a membrane process which will allow the passage of solvents and small solutes while retarding the passage of larger solute molecules, when a pressure gradient is applied across the membrane. This may be defined in terms of membrane rejection $R_i$, a common measure known by those skilled in the art and defined as:

$$R_i = \left(1 - \frac{C_{P_i}}{C_{R_i}}\right) \times 100\% \quad (1)$$

where $C_{P,i}$=concentration of species i in the permeate, permeate being the liquid which has passed through the membrane, and $C_{R,i}$=concentration of species i in the retentate, retentate being the liquid which has not passed through the membrane. It will be appreciated that a membrane is selectively permeable for a species i if $R_i$>0. It is well understood by those skilled in the art that nanofiltration is a process capable of retaining at least one solute molecule i with a molecular weight in the range about 200-5,000 g·mol$^{-1}$ at the surface of the membrane over at least one solvent, so that $R_i$>0. Typical applied pressures in nanofiltration range from 5 bar to 50 bar.

Similarly, ultrafiltration is a process known to the skilled person. Ultrafiltration is capable of retaining solute molecules with a molecular weight range of about 3000 to about 100,000 g·mol$^{-1}$.

In one embodiment, the at least one solute has a molecular weight in the range of about 100 to about 100,000 g·mol$^{-1}$.

In another embodiment, the at least one solute has a molecular weight in the range of about 100 to about 5,000 g·mol$^{-1}$. For example, a molecular weight in the range of about 200 to about 5,000 g·mol$^{-1}$, or a molecular weight in the range of about 500 to about 5,000 g·mol$^{-1}$.

In one embodiment, the at least one solute has a molecular weight in the range of about 100 to about 3,000 g·mol$^{-1}$, for example, about 200 to about 3,000 g·mol$^{-1}$.

In another embodiment, the at least one solute has a molecular weight in the range of about 1,000 to about 100,000 g·mol$^{-1}$. For example, a molecular weight in the range of about 2,000 to about 100,000 g·mol$^{-1}$, or a molecular weight in the range of about 3,000 to about 100,000 g·mol$^{-1}$, or a molecular weight in the range of about 5,000 to about 100,000 g·mol$^{-1}$, or a molecular weight in the range of about 10,000 to about 100,000 g·mol$^{-1}$.

In one embodiment, the solution comprises an organic solvent. For example, an organic solvent selected from aromatic hydrocarbons, alkanes, ketones, glycols, chlorinated solvents, esters, ethers, amines, nitriles, aldehydes, phenols, amides, carboxylic acids, alcohols, furans, and dipolar aprotic solvents, and mixtures thereof.

In another embodiment, the solution comprises a solvent selected from toluene, xylene, benzene, styrene, anisole, chlorobenzene, dichlorobenzene, chloroform, dichloromethane, dichloroethane, methyl acetate, ethyl acetate, butyl acetate, methyl ether ketone (MEK), methyl isobutyl ketone (MIBK), acetone, ethylene glycols, ethanol, methanol, propanol, butanol, hexane, cyclohexane, dimethoxyethane, methyl tert-butyl ether (MTBE), diethyl ether, adiponitrile, N,N-dimethylformamide, dimethylsulfoxide, N,N-dimethylacetamide, dioxane, nitromethane, nitrobenzene, pyridine, carbon disulfide, tetrahydrofuran, methyltetrahydrofuran, N-methyl pyrrolidone, acetonitrile, water, and mixtures thereof.

In another embodiment, the solution comprises water. In another embodiment, the solution comprises water as the only solvent.

In another embodiment, the solution comprises a mixture of water and an organic solvent. In another embodiment, the solution comprises a mixture of water and an organic solvent as the only solvent.

In one embodiment, the solution is an acidic solution. For example, the solution may have a pH in the range of about 0 to about 7, suitably a pH in the range of about 1 to about 7, suitably a pH in the range of about 2 to about 7, suitably a pH in the range of about 3 to about 7, suitably a pH in the range of about 4 to about 7, suitably a pH in the range of about 5 to about 7, suitably a pH in the range of about 6 to about 7.

In another embodiment, the solution may have a pH in the range of about 0 to about 6, suitably a pH in the range of about 1 to about 6, suitably a pH in the range of about 2 to about 6, suitably a pH in the range of about 3 to about 6, suitably a pH in the range of about 4 to about 6, suitably a pH in the range of about 5 to about 6.

In one embodiment, the solution comprises at least one strongly acidic compound or solvent. The term "strongly acidic" is used herein to refer to a compound or solvent which has a pKa of less than 5. By way of non-limiting example, specific strongly acidic solvents include mineral acids, sulfonic acids, and carboxylic acids and their derivatives, e.g. trifluoroacetic acid and acetic acid.

In one embodiment, the solution is a basic solution. For example, the solution may have a pH in the range of about 7 to about 14, suitably a pH in the range of about 7 to about 13, suitably a pH in the range of about 7 to about 12, suitably a pH in the range of about 7 to about 11, suitably a pH in the range of about 7 to about 10, suitably a pH in the range of about 7 to about 9, suitably a pH in the range of about 7 to about 8.

In another embodiment, the solution may have a pH in the range of about 8 to about 14, suitably a pH in the range of about 8 to about 13, suitably a pH in the range of about 8 to about 12, suitably a pH in the range of about 8 to about 11, suitably a pH in the range of about 8 to about 10, suitably a pH in the range of about 8 to about 9.

In one embodiment, the solution comprises at least one strongly basic compound or solvent. The term "strongly basic" is used herein to refer to a compound which has a pKa of greater than 9.

By way of non-limiting example, specific strongly basic compound/solvents include amines, in particular alkanolamines, alkyl amines, and polyamines, such as alkyl diamines, alkyl triamines, piperidine and derivatives including alkylated piperidine, pyridine and alkyl pyridines including alkyl, dialkyl and trialkyl pyridines, and including and including ethyl amine, ethylenediamine, diethylenetriamine, triethylenetetramine, monomethylamine, mimethylamine trimethylamine, monoethylamine, diethylamine, triethylamine, isopropylamine, diisopropylamine, mono-n-propylamine, di-n-propylamine, tri-n-propylamine, di-n-butylamine, tri-n-butylamine, cyclohexylamine, dicyclohexylamine, dimethylcyclohexylamine, pentamethyldiethylenetriamine, pentamethyldipropylenetriamine, tetramethyldipropylenetriamine, benzyldimethylamine, tetramethylbis(aminoethyl)ether, N,N-dimethyl-2(2-aminoethoxy)ethanol, 3-amino propanol, N-ethylmethylamine, 2-ethoxy ethylamine, N,N-diethylhydroxylamine, N-ethyl-N-(1,2-dimethylpropyl) amine, diisopropylmethylamine, 2-ethylhexylamine, dimethylbutyl amine, 3-methoxypropylamine, 3-(2-ethylhexoxy)-1-propanamine, methylaminopropylamine, dimethylaminopropylamine, methoxypropylamine, 3-ethoxy propylamine, N,N-diisopropylethylamine, dimethylisopropylamine, bis-2-ethylhexylamine, diethylmethylamine, N-methylisopropylamine, dibenzyl hydroxylamine, monoethanolamine, diethanolamine, triethanolamine, dimethylethanolamine, N-methyldiethanolamine, monomethylethanolamine, 2-(2-aminoethoxy)ethanol, polyoxyalkyleneamines, monopropanol amines, morpholine, N-methylmorpholine, N-ethylmorpholine, N-methylmorpholine oxide, aminopropylmorpholine, quinoline, and solutions of metal alkoxides having from one to six alkyl carbon atoms such as sodium methoxide, sodium ethoxide, and alkyl aryl amine hydroxides such as particularly preferred benzyl trimethyl ammonium hydroxide.

The term "solute" will be well understood by the average skilled reader. In one embodiment, the at least one solute is an organic compound.

The membranes of the present invention are particularly suited to filtration processes for separating organic molecules produced in chemical synthesis reactions.

In one embodiment, the at least one solute is selected from biological polymers, such as peptides, peptide nucleic acids and oligonucleotides. In another embodiment, the at least one solute is a biological polymer as described in U.S. Pat. No. 8,664,357 and in Liquid-Phase Synthesis of 2'-Methyl-RNA on a Homostar Support through Organic-Solvent Nanofiltration Chemistry—A European Journal Volume 21, Issue 26, 1 Jun. 2015, Pages 9535-9543 by Gaffney, P. R. J.[a], Kim, J. F. Valtcheva, I. B., Williams, G. D., Anson, M. S., Buswell, A. M., Livingston, A. G. which is incorporated herein by reference.

Figure 2:
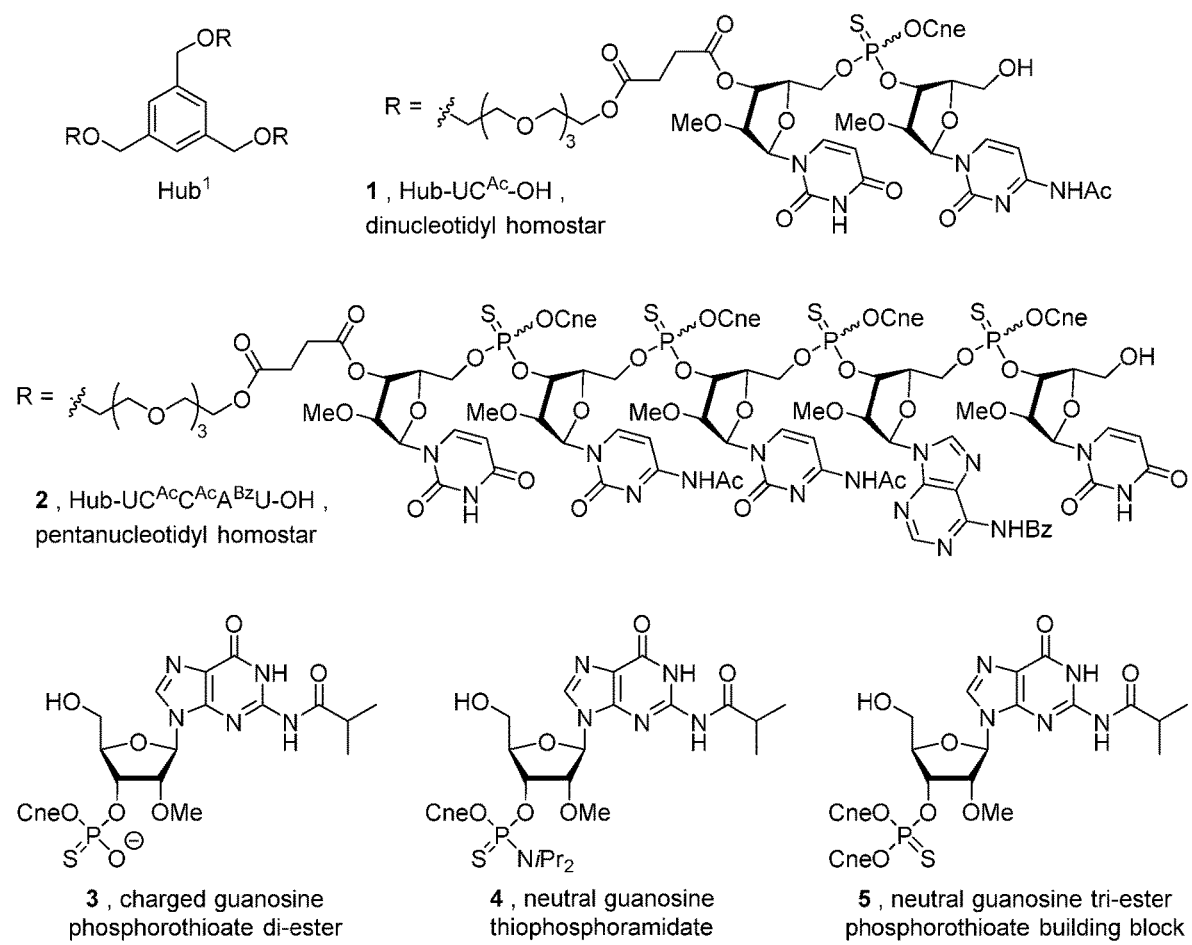
FIG. 2 shows the structure of the solutes present in the feed solution of examples 1 and 2.
Figure 7:
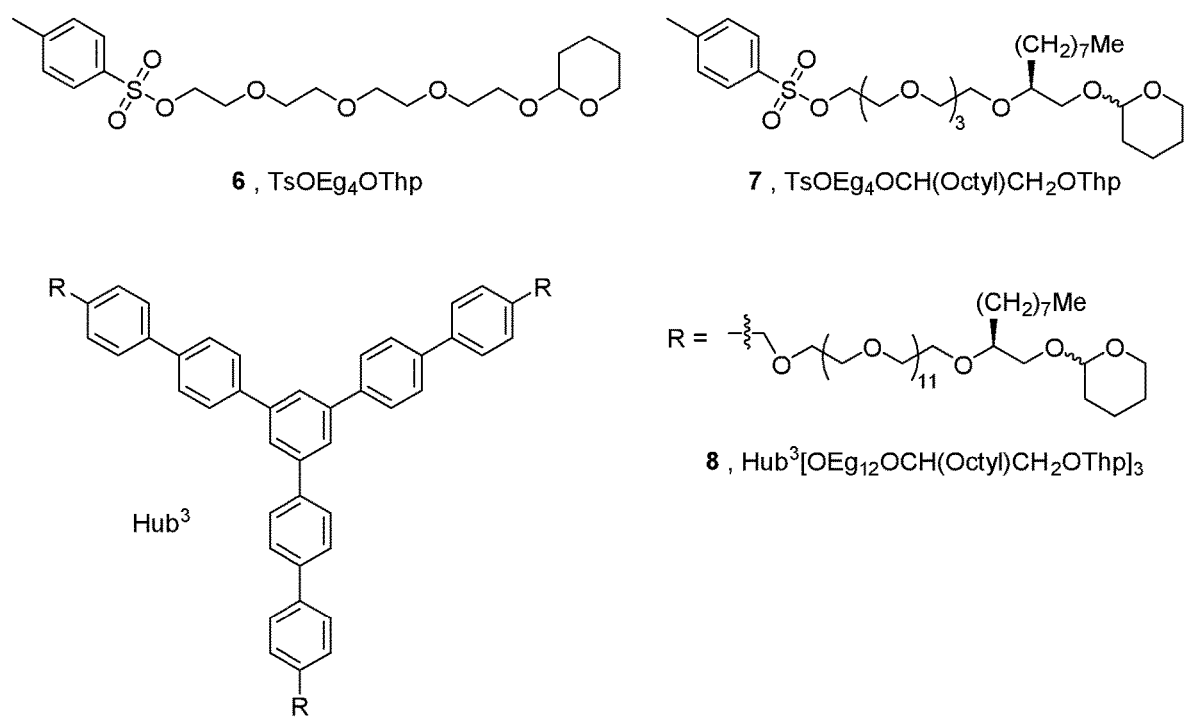
FIG. 7 shows the structure of the solutes present in the feed solution of example 5.

In another embodiment, the at least one solute is selected from one or more compounds depicted in FIG. 2 or FIG. 7.

In yet a further embodiment, the least one solute is an ionic organic molecule or an organic salt.

In another embodiment, the at least one solute is a synthetic polymer, such as polyethylene glycol and it derivatives. In one embodiment, the at least one solute is a solute as described in WO/2011/148177, and in WO/2016/020696, and in "Beyond PEG2000: Synthesis and Functionalisation of Monodisperse PEGylated Homostars and Clickable Bivalent Polyethyleneglycols", Chemistry-A European J. (2014) vol. 20 issue 32 pp. 10038-10051 by Szekely, G, Schaepertoens, M, Gaffney, P, and Livingston, AG, and in "Iterative Synthesis of Monodisperse PEG Homostars and Linear Heterobifunctional PEG", Polym. Chem., 2014, 5 (3), 694-697 by Szekely, G, Schaepertoens, M, Gaffney, P, and Livingston, AG. which are incorporated herein by reference.

The membrane of the present invention can be configured in accordance with any of the designs known to those skilled in the art. In one embodiment, the membrane is configured as a spiral wound, plate and frame, shell and tube membrane, and derivative designs thereof. Suitably, the membrane is spiral wound.

Membranes of the invention can be made by dissolving the desired polybenzimidazole polymer in a solvent together with optional viscosity enhancers, optional void suppressors, and optionally discrete particles of an immiscible matrix, to give a viscous polymer dope solution, spreading the solution upon a porous support to form a film, optionally partially evaporating the solvent, and quenching the film, e.g. in water. This precipitates the polymer and forms an asymmetric membrane by a phase inversion process.

In one embodiment, the membranes of the present invention further comprise a discrete matrix dispersed in the membrane. Suitably the matrix may be an inorganic or organic matrix.

Organic or inorganic matrices in the form of powdered solids may be present in amounts up to 50 wt %, suitably up to about 20 wt %, of the said polymer dope solution.

Suitable matrices include carbon molecular sieve matrices which can be prepared by pyrolysis of any suitable material as described in U.S. Pat. No. 6,585,802. Furthermore, graphene or graphene oxide flakes, or 2-D carbon flakes as described in UK Patent Application 1510761.8 may be added to the polymer dope solution. Zeolites as described in U.S. Pat. No. 6,755,900 may also be used as an inorganic matrix. Metal oxides, such as titanium dioxide, zinc oxide and silicon dioxide may be used, for example the materials available from Evonik Degussa AG (Germany) under their Aerosol and AdNano trademarks. Mixed metal oxides such as mixtures of cerium, zirconium, and magnesium may be used.

In one embodiment, the matrices will have particles less than about 1.0 micron in diameter, preferably less than about 0.1 microns in diameter, and more preferably less than about 0.01 microns in diameter. In some cases it may be advantageous to disperse the matrices in a separate solution from the dope solution, preferably an organic solvent solution, and then subsequently add this solution to the dope solution containing the polymer. In a preferred embodiment crystals or nanoparticles of an inorganic matrix, for example zeolites or metal oxides, may be grown to a selected size in a separate solution from the dope solution, and this dispersion solution subsequently added to the dope solution containing the polymer. This separate solution may comprise/consist of water or an organic solvent with nanoparticles dispersed in the continuous liquid phase. In yet a further preferred embodiment, the solvent in which the matrix is dispersed may be volatile, and it may be removed from the dope solution prior to membrane casting by evaporation.

The membranes of the present invention comprise a polybenzimidazole (PBI) polymer.

Suitable PBI polymers are presented in the prior art, including U.S. Pat. Nos. 3,699,038, 3,720,607, 3,737,402, 3,841,492, 4,448,687, 4,693,824 and 4,693,825, each of which are incorporated by reference.

Processes for producing suitable polybenzimidazoles are known to those skilled in the art and include those described in U.S. Pat. No. 2,895,948, U.S. Pat. No. Re 26,065, U.S. Pat. Nos. 3,313,783, 3,509,108, 3,555,389, 3,433,772, 3,408,336, 3,549,603, 3,708,439, 4,154,919, 4,312,976, 5,410,012, 5,554,715, AU 2011281326, and in the Journal of Polymer Science, Vol 50, pages 511-539 (1961), each incorporated by reference.

In one embodiment, a polybenzimidazole polymer comprised in the membranes of the invention has the following general repeat structure (I) shown below:

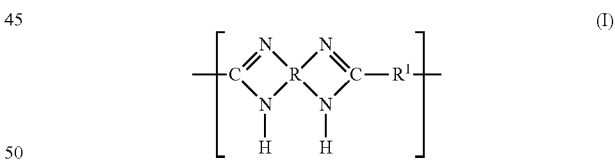

where R is a tetravalent aromatic nucleus, typically symmetrically substituted, with the nitrogen atoms forming the benzimidazole rings being paired upon adjacent carbon atoms of the aromatic nucleus, and $R^1$ is a divalent substituent selected from aliphatic, alicyclic and aromatic radicals.

Suitably, the R group in the general repeat structure I shown above has the structure (II) shown below:

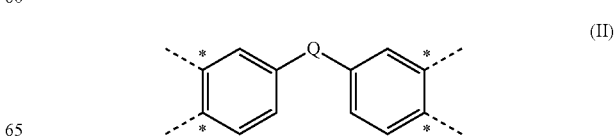

wherein Q is a direct bond between the adjacent rings or an alkylene linker and * marks the point of attachment with the N atoms of the fused imidazole rings.

In an embodiment, Q is a direct bond.

The $R^1$ substituents in the general repeat structure I can include (1) an aromatic ring, (2) an arylene group, (3) an alkylene group, (4) an arylene-ether group, and (5) a heterocyclic ring. A suitable example of an aromatic ring is phenyl. A suitable example of an arylene group is phenylene. The term "alkylene group" includes (1-20C) alkylene groups. In an embodiment, an alkylene group is a (1-6C) alkylene group. An arylene-ether group is suitably a group of the general formula (III)

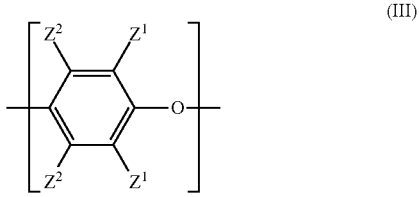

wherein each $Z^1$ or $Z^2$ group is hydrogen or a hydrocarbyl substituent group (suitably a 1-6C hydrocarbyl group). When $R^1$ is a heterocyclic ring, it is suitably a saturated, unsaturated or partially saturated monocyclic or bicyclic ring containing 4 to 12 atoms of which 1, 2, 3 or 4 ring atoms are chosen from nitrogen, sulphur or oxygen, which ring may be carbon or nitrogen linked, wherein a —$CH_2$— group can optionally be replaced by a —C(O)—; and wherein a ring nitrogen or sulphur atom is optionally oxidised to form the N-oxide or S-oxide(s). Particular examples of heterocyclic rings include pyridine, pyrazine, furan, quinoline, thiophene, or pyran.

A further preferred class of polybenzimidazole polymers useful to prepare the membranes of the invention has the following general repeat structure (IV) shown below:

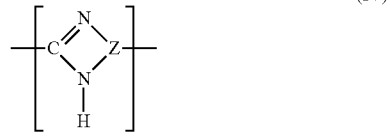

where Z is an aromatic nucleus having the nitrogen atoms forming the benzimidazole ring paired upon adjacent carbon atoms of the aromatic nucleus. Further polybenzimidazoles useful in the invention are mixtures of polymers with structure (I) and polymers with structure (IV).

Suitably Z is a fused phenyl ring.

A preferred polybenzimidazole for forming the membranes of the invention is poly(2,2'-[m-phenylene])-5,5'-bis-benzimidazole which has the formula shown below:

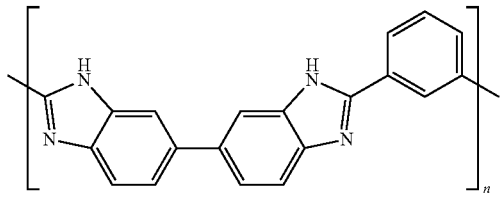

wherein n is an integer.

Suitably, n is an integer within the range of 10 to 5000, more typically 20 to 3000 and even more typically 50 to 2000.

In one embodiment, the PBI polymer is selected from Celazole® S26 from PBI Performance Products.

As used herein, the term "cross-linked" as used in reference to the polybenzimidazole (PBI) polymer refers to a PBI polymer which has been treated with a cross-linking agent to yield a polymer which comprises chemical bonding of the cross-linking agent to the polymer chains. The skilled person would understand that said chemical bonding will typically result in the cross-linking agent reacting with adjacent polymer chains to provide a cross-link, as well as the cross-linking agent reacting with a single polymer chain such that the cross-linking agent is pendant from a single polymer chain (the polymer may be described as partially cross-linked).

Consequently, in one embodiment a cross-linked PBI polymer comprises fully reacted cross-linking agent and partially reacted cross-linking agent.

In the case where the cross-linking agent is pendant from a single polymer chain, the cross-linking agent has not fully reacted in order to cross-linked adjacent polymer chains, and there will be an unreacted residual functional group of the cross-linking agent pendant from the polymer chain.

In one embodiment, the PBI polymer comprises the following substructure:

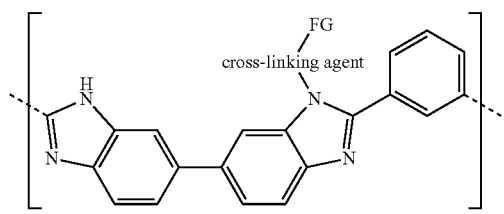

wherein FG is an unreacted functional group of the cross-linking agent.

In one embodiment, the membrane comprises the following substructure:

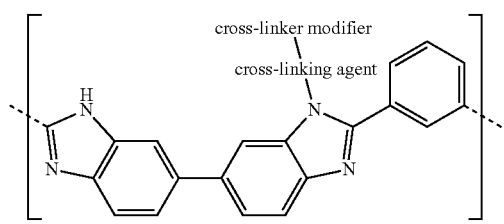

In one embodiment the polymer is cross-linked with a cross-linking agent described in U.S. Pat. Nos. 4,666,996, 6,986,844, 4,734,466, and 4,020,142, all of which are incorporated herein by reference.

In another embodiment, the polymer is cross-linked with a cross-linking agent which comprises an electrophilic functional group.

In another embodiment, the polymer is cross-linked with a cross-linking agent which is a multifunctional halide or a divinyl sulfone.

In one embodiment, the multifunctional halide is a multifunctional alkyl halide. Multifunctional alkyl halides include at least two halide substituents. In one embodiment, the multifunctional alkyl halide has two halide substituents, i.e. a difunctional alkyl halide.

In one embodiment, the polymer is cross-linked with a cross-linking agent having a general structure (V):

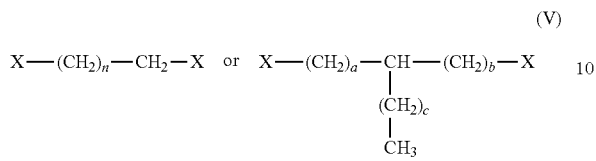

where X is Br or Cl, n is 1 to 11, a is 1 to 10, b is 0 to 4, and c is 0 to 6.

In one embodiment, the cross-linking agent is a difunctional alkyl halide which comprises a straight chain, terminally di-substituted group having the structure X—$(CH_2)_n CH_2$—X where X and n are as defined above. A suitable difunctional alkyl halide is 1,4-dibromobutane (DBB).

In another embodiment, the alkyl halide may contain three or more halide substituents. Exemplary alkyl halides with three or more halide substituents include tribromopropane, trichloropropane, pentaerythrityl tetrabromide, and pentaerythrityl tetrachloride.

Further suitable cross-linking agents include divinylsulfones with the general formula (VI):

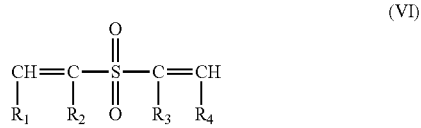

wherein each of $R_1$-$R_4$ is the same or different and is selected from H or $C_1$-$C_3$ alkyl.

In one embodiment the cross-linking agent is divinyl sulfone:

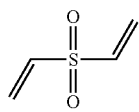

In another embodiment, the polymer is cross-linked with a cross-linking agent which is an unsubstituted or substituted dibenzylhalide. For instance, an unsubstituted or substituted dibenzylhalide of general structure A, B, C, D or E:

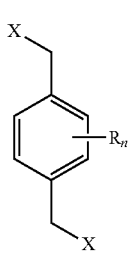

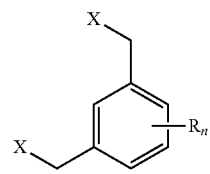

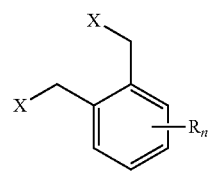

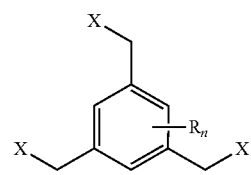

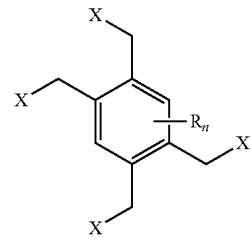

wherein X is Cl or Br and R is selected from H, halo, $C_1$-$C_3$ alkoxy and $C_1$-$C_3$ alkyl, and n is 0, 1, 2, 3 or 4.

In on embodiment, the polymer is cross-linked with a cross-linking agent which is of general formula A, wherein n=0.

In one embodiment, the polymer is cross-linked with a cross-linking agent which is dibromoxylene.

In another embodiment, the polymer is cross-linked with a cross-linking agent which is selected from dibromoxylene, dibromobutane, tribromopropane, trichloropropane, pentaerythrityl tetrabromide, pentaerythrityl tetrachloride, divinyl sulfone, 1,3,5-tri(bromomethyl)benzene, and 1,2,4,5-tetra(bromomethyl)benzene.

In another embodiment, the polymer is cross-linked with a cross-linking agent which is selected from dibromoxylene, dibromobutane, tribromopropane, trichloropropane, pentaerythrityl tetrabromide, pentaerythrityl tetrachloride, and divinyl sulfone.

As used herein the term "cross-link modifier" refers to the residue of a cross-link modification agent after it has reacted with an unreacted functional group of the cross-linking agent. Accordingly, in one embodiment, the cross-link modifier is bonded to the cross-linked PBI polymer. In a more specific embodiment, the cross-link modifier is bonded to the partially reacted cross-linking agent, in particular the unreacted functional group of the partially reacted cross-linking agent.

In one embodiment, the cross-link modifier is bonded to a pendent functional group on the polymer chain. For example, a pendent residual functional group of the cross-linking agent bonded to the polymer chain.

In one embodiment, the cross-link modifier is the residue of the cross-link modification agent after it has reacted with an unreacted functional group of the cross-linking agent, wherein the cross-link modification agent is an organic molecule which comprises at least one functional group that will undergo reaction with residual functional groups of the cross-linking agent. In another embodiment, the cross-link modification agent is an organic molecule which comprises only one functional group that will undergo reaction with a residual functional group of the cross-linking agent.

In one embodiment, the cross-link modifier is non-functional, i.e. the cross-link modifier does not comprise a functional group. For instance, when the cross-link modification agent is an organic molecule which comprises only one functional group and said functional group undergoes reaction with a residual functional group of the cross-linking agent, the resultant cross-link modifier is non-functional.

In another embodiment, the cross-link modification agent comprises a functional group capable of reacting with a functional group on the cross-linking agent which has not completely reacted with the polybenzimidazole polymer.

In another embodiment, the cross-link modification agent comprises a functional group capable of reacting with an electrophilic functional group on the cross-linking agent.

In another embodiment, the cross-link modification agent comprises a functional group capable of reacting with an alkyl/benzyl halide or a vinyl sulfone group in the cross-linking agent.

In another embodiment, the cross-link modification agent comprises a functional group capable of reacting with a benzyl halide or a vinyl sulfone group in the cross-linking agent.

In another embodiment, the cross-link modification agent comprises a nucleophilic functional group, suitably only one nucleophilic group.

In another embodiment, the cross-link modification agent comprises a functional group selected from an amine, a thiol, a thiolate, a phenoxide, a carboxylate, a sulfonate, a phosphate, a phosphonate, a hydroxylamine, an oximate, a hydrazine, a hydrazone, an imide and a hydrazide.

In another embodiment, the cross-link modification agent comprises an amine. In another embodiment, the cross-link modification agent is a mono-amine.

In another embodiment, the cross-link modification agent comprises a single functional group selected from an amine, a thiol, a thiolate, a phenoxide, a hydroxide, a carboxylate, a hydroxylamine, an oximate, a hydrazine, a hydrazone, an imide and a hydrazide. Suitably, in one embodiment, the cross-link modification agent comprises a single functional group which is an amine.

In another embodiment, the cross-link modification agent is selected from alkyl or dialkyl amines, amino steroids, amino glycosides, amino acids, polyaminoacids, amino lipids, amino aromatic and heteroaromatic nuclei.

In another embodiment, the cross-link modification agent is selected from $C_{1-6}$ alkyl or $C_{2-12}$ dialkyl amines.

In another embodiment, the cross-link modification agent is selected from a polyetheramine. In another embodiment, the cross-link modification agent is a polyether monoamine (e.g. Jeffamine® M-600, M-1000, M-2005, XTJ-436).

In another embodiment, the cross-link modification agent is selected from a polyetheramine (e.g. Jeffamines®), 4-amino-tetraphenylmethane, polyethylene imine, phosphatidyl ethanaolamine, sphingosine, and 3-aminopropyl trimethoxysilane.

In another embodiment, the cross-link modification agent is selected from a polyetheraine (e.g. Jeffamine®) and 4-amino-tetraphenylmethane.

In another embodiment, the cross-link modification agent comprises a thiolate or a thiol group.

In another embodiment, the cross-link modification agent is a cysteine derivative or an alkyl thiol. In another embodiment, the cross-link modification agent is a 01-6 alkyl thiol.

In another embodiment, the cross-link modification agent is selected from methylamine, ethylamine, dimethylamine, diethylamine, ethanolamine, aniline, alanine, glycine, ammonia, hydroxylamine, hydrazine, hydrogen peroxide, hydrogen sulphide, 2-mercaptoethanol, 2-mercaptoacetic acid, 3-mercaptopropionic acid, and 3-mercaptopropane sulfonate salts.

Use/Methods

In another aspect, the present invention provides the use of an asymmetric integrally skinned membrane as defined herein for the filtration of a solution comprising at least one solute.

In one embodiment, the present invention provides the use of an asymmetric integrally skinned membrane as defined herein for the nanofiltration of a solution comprising at least one solute.

In another embodiment, the present invention provides the use of an asymmetric integrally skinned membrane as defined herein for the ultrafiltration of a solution comprising at least one solute.

In another aspect, the present invention provides a method of separating at least one solute present in a solution by nanofiltration, wherein said method comprises passing the feed through an asymmetric integrally skinned membrane as defined herein.

In another aspect, the present invention provides a method of separating at least one solute present in a solution by ultrafiltration, wherein said method comprises passing the feed through an asymmetric integrally skinned membrane as defined herein.

In one embodiment, of each of the above aspects the solution comprises at least one organic solvent.

In another embodiment, of each of the above aspects, the solution is basic.

In another embodiment, of each of the above aspects, the solution is acidic.

In another embodiment, of each of the above aspects, the solutes are selected from organic molecules resulting from the synthesis via protecting group chemistry of peptides, peptide nucleic acids, oligonucleotides and oligosaccharides.

In another embodiment, of each of the above aspects, the solutes are selected from biological polymers, such as peptides, peptide nucleic acids and oligonucleotides.

In another embodiment, of each of the above aspects, the solutes are selected from a synthetic polymer, such as polyethylene glycol and its derivatives.

In another embodiment, of each of the above aspects, the solutes are selected from an ionic organic molecule or an organic salt.

The invention will now be further described by means of the following numbered paragraphs:

1. A process for preparing an asymmetric integrally skinned membrane for the separation of at least one solute from a solution, comprising the steps of:
(a) preparing a polybenzimidazole dope solution comprising:
  (i) a polybenzimidazole polymer, and
  (ii) a solvent system for said polybenzimidazole which is water miscible;

(b) casting a film of said dope solution onto a support;

(c) immersing the film cast on the support into a coagulating medium to form an asymmetric integrally skinned membrane;

(d) treating the membrane from step (c) with a cross-linking agent;

(e) treating the membrane from step (d) with a cross-link modification agent.

2. A process according to paragraph 1 wherein the solvent system for the polybenzimidazole polymer comprises one or more solvents selected from N-methyl-2-pyrrolidone, tetrahydrofuran, N,N-dimethylformamide, dimethylsulfoxide, N,N-dimethylacetamide, 1,4-dioxane, gamma-butyrolactone, water, alcohols, ketones, and formamide.

3. A process according to any preceding paragraph wherein the solvent system for the polybenzimidazole polymer comprises/consists of N,N-dimethylacetamide.

4. A process according to any preceding paragraph, wherein the polybenzimidazole polymer is present in amounts of about 5 to about 30% by weight of said dope solution.

5. A process according to any preceding paragraph wherein the polybenzimidazole polymer has the following general repeat structure (I) shown below:

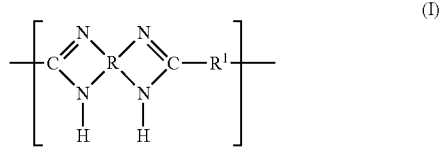

where R is a tetravalent aromatic nucleus, typically symmetrically substituted, with the nitrogen atoms forming the benzimidazole rings being paired upon adjacent carbon atoms of the aromatic nucleus, and $R^1$ is a divalent substituent selected from aliphatic, alicyclic and aromatic radicals.

6. A process according to any preceding paragraph wherein the polybenzimidazole polymer has the following formula:

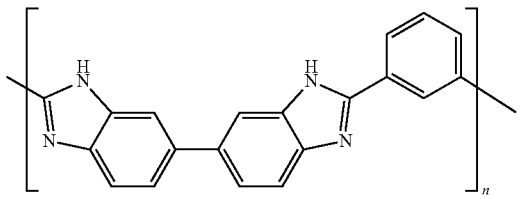

wherein n is an integer in the range of 10 to 5000.

7. A process according to any preceding paragraph, wherein the polybenzimidazole dope solution further comprises a viscosity enhancer in amounts of up to about 10% by weight of said dope solution.

8. A process according to any preceding paragraph wherein the polybenzimidazole dope solution further comprises a viscosity enhancer selected from polyvinyl pyrrolidones, polyethylene glycols and urethanes.

9. A process according to any preceding paragraph wherein the polybenzimidazole dope solution further comprises a void suppressor used in amounts up to about 5% of the weight of said polybenzimidazole dope solution.

10. A process according to any preceding paragraph, wherein the polybenzimidazole dope solution further comprises a discrete organic matrix dispersed in the polybenzimidazole dope solution at amounts up to 20% by weight of said dope solution.

11. A process according to any preceding paragraph, wherein the polybenzimidazole dope solution further comprises a discrete inorganic matrix dispersed in the polybenzimidazole dope solution at amounts up to about 20% by weight of said dope solution.

12. A process according to any preceding paragraph, wherein the average particle size of the discrete matrix is less than about 0.1 micron.

13. A process according to any preceding paragraph in which the discrete matrix is first dispersed in a solvent and subsequently added to the dope solution.

14. A process according to any preceding paragraph wherein the support is an inert porous material.

15. A process according to any preceding paragraph wherein the support is a non-woven polymeric material, such as a polyester, polyethylene, polypropylene, polyetherether ketone (PEEK), polyphenylene sulphide (PPS), Ethylene-ChloroTriFluoroEthylene (Halar® ECTFE), or carbon fibre material.

16. A process according to any preceding paragraph wherein after step (b) a portion of solvent is evaporated by exposure to air for a duration of less than about 100 seconds.

17. A process according to any preceding paragraph wherein the coagulating medium comprises/essentially consists of/consists of a solvent selected from one or more of water, an alcohol and a ketone.

18. A process according to any preceding paragraph, wherein the cross-linking agent is dissolved in a solvent selected from acetonitrile, ketones, ethers, carboxylic acids and alcohols.

19. A process according to any preceding paragraph, wherein the cross-linking agent is dissolved in a solvent selected from acetonitrile, toluene, acetone, methyl isobutyl ketone (MIBK), methyl ethyl ketone (MEK), pentanone, isopropyl ether and butyl ether.

20. A process according to preceding paragraph wherein the quantity of cross-linking agent used to treat the membrane is adjusted so that the reactive groups in the cross-linking agent and polybenzimidazole amine hydrogen groups in the membrane treated is in the range of about 0.1 to about 100.

21. A process according to preceding paragraph wherein the reaction time for cross-linking is from about 0.1 to about 120 hours.

22. A process according to any preceding paragraph in which the temperature of cross-linking reaction is between about 50 and 120° C.

23. A process according to any preceding paragraph, wherein the cross-linker comprises an electrophilic functional group.

24. A process according to any preceding paragraph, wherein the cross-linking agent is a multifunctional halide, multifunctional sulfonate ester or a divinyl sulfone.

25. A process according to any preceding paragraph, wherein the cross-linking agent is an unsubstituted or substituted compound of general structure, A, B, C, D or E:

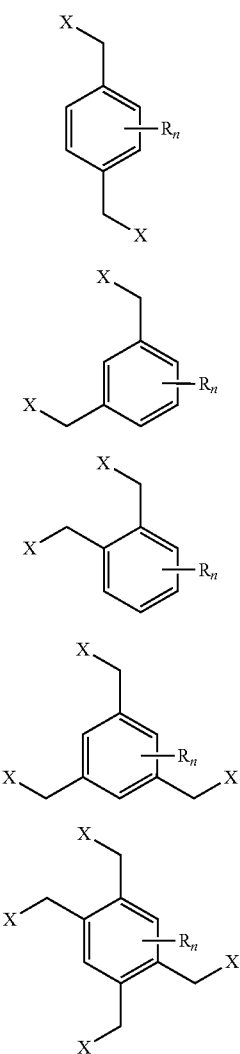

A

B

C

D

E wherein X is Cl or Br, R is selected from H or $C_1$-$C_3$ alkyl, halo, $C_1$-$C_3$ alkoxy, and n is 0, 1, 2, 3 or 4.

25. A process according to any preceding paragraph, wherein the cross-linking agent is selected from dibromoxylene, dibromobutane, tribromopropane, trichloropropane, pentaerythrityl tetrabromide, pentaerythrityl tetrachloride, divinyl sulfone.

26. A process according to any preceding paragraph, wherein the cross-link modification agent comprises a functional group capable of reacting with a functional group on the cross-linker which has not completely reacted with the polybenzimidazole polymer.

27. A process according to any preceding paragraph, wherein the cross-link modification agent comprises a functional group capable of reacting with an electrophilic functional group on the cross-linking agent.

28. A process according to any preceding paragraph, wherein the cross-link modification agent comprises a functional group capable of reacting with an alkyl halide, benzyl halide or a vinyl sulfone group in the cross-linker.

29. A process according to any preceding paragraph, wherein the cross-link modification agent comprises a functional group capable of reacting with a benzyl halide or a vinyl sulfone group in the cross-linker.

30. A process according to any preceding paragraph, wherein the cross-link modification agent comprises a nucleophilic functional group, suitably a single nucleophilic group.

31. A process according to any preceding paragraph, wherein the cross-link modification agent comprises a functional group selected from an amine, a thiol, a thiolate, a phenoxide, a carboxylate, a hydroxylamine, a oximate, a hydrazine, a hydrazone, an imide and a hydrazide.

32. A process according to any preceding paragraph, wherein the cross-link modification agent is an amine, suitably a mono-amine.

33. A process according to any preceding paragraph, wherein the cross-link modification agent is selected from alkyl or dialkyl amines, amino steroids, amino glycosides, amino acids, polyaminoacids, amino lipids, amino aromatic and heteroaromatic nuclei.

34. A process according to any preceding paragraph, wherein the cross-link modification agent is selected from $C_{1-6}$ alkyl or $C_{2-12}$ dialkyl amine.

35. A process according to any preceding paragraph, wherein the cross-link modification agent is a polyetheramine.

36. A process according to any preceding paragraph, wherein the cross-link modification agent is selected from a polyetheramine (e.g. Jeffamines®), 4-amino-tetraphenylmethane, polyethylene imine, phosphatidyl ethanaolamine, sphingosine, and 3-aminopropyl trimethoxysilane.

37. A process according to any preceding paragraph, wherein the cross-link modification agent is a thiolate or a thiol.

38. A process according to any preceding paragraph, wherein the cross-link modification agent is a cysteine derivatives or an alkyl thiol.

39. A process according to any preceding paragraph, wherein the cross-link modification agent is selected from methylamine, ethylamine, dimethylamine, diethylamine, ethanolamine, aniline, alanine, glycine, ammonia, hydroxylamine, hydrazine, hydrogen peroxide, hydrogen sulphide, 2-mercaptoethanol, 2-mercaptoacetic acid, 3-mercaptopropionic acid, and 3-mercaptopropane sulfonate salts.

40. A process according to any preceding paragraph, further comprising (f) treating the membrane with a non-reactive conditioning agent.

41. A process according to any preceding paragraph wherein the membrane is further treated with a non-reactive conditioning agent is selected from one or more of synthetic oils (including polyolefinic oils, silicone oils, polyalphaolefinic oils, polyisobutylene oils, synthetic wax isomerate oils, ester oils and alkyl aromatic oils), mineral oils (including solvent refined oils and hydroprocessed mineral oils and petroleum wax isomerate oils), vegetable fats and oils, higher alcohols (such as decanol, dodecanol, heptadecanol), glycerols, and glycols (such as polypropylene glycols, polyethylene glycols, polyalkylene glycols).

42. A process according to any preceding paragraph further comprising (g) drying the membrane.

43. A process according to any preceding paragraph, wherein the process further comprises a step of heating the membrane to between about 150° C. and about 300° C. for between about 1 minute and about 2 hours.

44. A process according to any preceding paragraph in which the resulting membrane is configured as spiral wound, plate and frame, shell and tube, or derivative designs thereof.

45. An asymmetric integrally skinned membrane obtainable/obtained by the process according to any one of paragraphs 1 to 44.

46. An asymmetric integrally skinned membrane for the separation of at least one solute from a solution wherein the membrane comprises/consists of a cross-linked polybenzimidazole polymer wherein the polymer comprises a cross-link modifier.
47. A membrane according to paragraph 46 which is an integrally skinned asymmetric membrane.
48. A membrane according to any one of paragraphs 46 to 47 wherein the membrane is an ultrafiltration.
49. A membrane according to paragraph 48 wherein the solute has a molecular weight in the range 2000-100,000 g·mol$^{-1}$, suitably 5000 to 100,000 g·mol−1.
50. A membrane according to any one of paragraphs 46 to 47 wherein the membrane is a nanofiltration membrane.
51. A membrane according to paragraph 50 wherein the solute has a molecular weight in the range 100-3,000 g·mol−1, suitably 500 to 2,000 g·mol−1.
52. A membrane according to any one of paragraphs 46 to 51 wherein the solution comprises an organic solvent.
53. A membrane according to any one of paragraphs 46 to 52 wherein the solution is acidic.
54. A membrane according to any one of paragraphs 46 to 52 wherein the solution is basic.
55. A membrane according to any one of paragraphs 46 to 54 wherein membrane essentially consists of a cross-linked polybenzimidazole polymer and a cross-link modifier.
56. A membrane according to any one of paragraphs 46 to 55 wherein the membrane consists of a cross-linked polybenzimidazole polymer and a cross-link modifier.
57. A membrane according to any one of paragraphs 46 to 56 wherein the cross-link modifier is bonded to functional groups on the cross-linking agent which have not completely reacted with the polybenzimidazole polymer.
58. A membrane according to any one of paragraphs 46 to 57 wherein the polybenzimidazole polymer has the following general repeat structure (I) shown below:

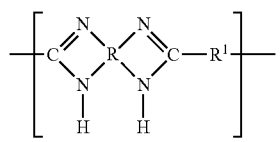

(I)

where R is a tetravalent aromatic nucleus, typically symmetrically substituted, with the nitrogen atoms forming the benzimidazole rings being paired upon adjacent carbon atoms of the aromatic nucleus, and R$^1$ is a divalent substituent selected from aliphatic, alicyclic and aromatic radicals.
59. A membrane according to any one of paragraphs 46 to 58 wherein the polybenzimidazole polymer has the following formula:

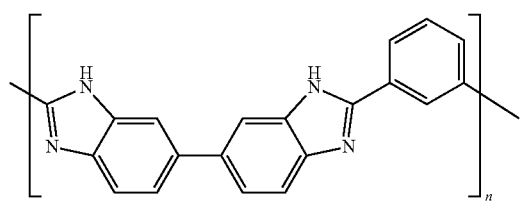

wherein n is an integer in the range of 10 to 5000.
60. A membrane according to any one of paragraphs 46 to 59 comprising the following substructure

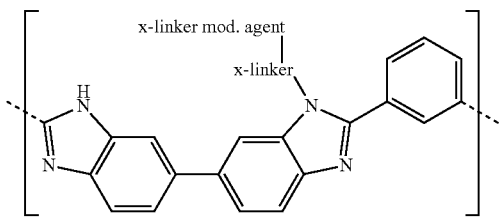

61. A membrane according to paragraph 57, wherein the cross-linking agent comprises an electrophilic functional group.
62. A membrane according to any one of paragraphs 57 and 61, wherein the cross-linking agent is a multifunctional halide, multifunctional sulfonate ester or a divinyl sulfone.
63. A membrane according to any one of paragraphs 57, 61 and 62, wherein the cross-linking agent is selected from dibromoxylene, dibromobutane, tribromopropane, trichloropropane, pentaerythrityl tetrabromide, pentaerythrityl tetrachloride, divinyl sulfone.
64. A membrane according to any one of paragraphs 57, 61 to 63, wherein the cross-linking agent is an unsubstituted or substituted compound of general structure, A, B, C, D or E:

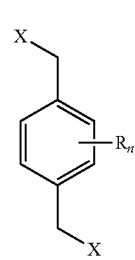

A

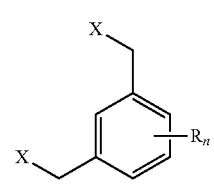

B

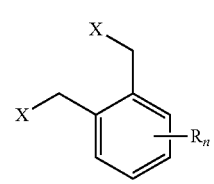

C

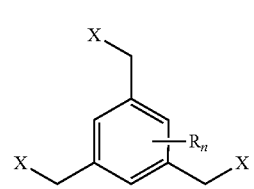

D

-continued

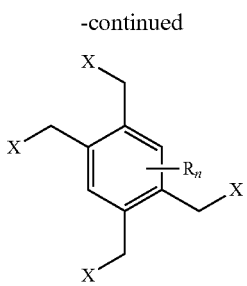

E wherein X is Cl or Br, R is selected from H or $C_1$-$C_3$ alkyl, halo, $C_1$-$C_3$ alkoxy, and n is 0, 1, 2, 3 or 4.

65. A membrane according to any one of paragraphs 57, 61 and 62, wherein the cross-linking agent is selected from dibromoxylene, dibromobutane, tribromopropane, trichloropropane, pentaerythrityl tetrabromide, pentaerythrityl tetrachloride, divinyl sulfone.

66. A membrane according to any one of paragraphs 46 to 65, wherein the cross-link modifier is bonded to a pendent functional group on the polymer chain.

67. A membrane according to any one of paragraphs 46 to 66, wherein the cross-link modifier is bonded to a pendant functional group on the partially reacted cross-linking agent on the polymer chain.

68. A membrane according to any one of paragraphs 46 to 67, wherein the cross-link modifier is the residue of a cross-link modification agent comprising a functional group capable of reacting with a functional group on the cross-linker which has not completely reacted with the polybenzimidazole polymer.

69. A membrane according to any one of paragraphs 46 to 68, wherein the cross-link modifier is the residue of a cross-link modification agent comprising a functional group capable of reacting with an electrophilic functional group on the cross-linking agent.

70. A membrane according to any one of paragraphs 46 to 69, wherein the cross-link modifier is the residue of a cross-link modification agent comprising a functional group capable of reacting with an alkyl halide, benzyl halide or a vinyl sulfone group in the cross-linker.

71. A membrane according to any one of paragraphs 46 to 70, wherein the cross-link modifier is the residue of a cross-link modification agent comprising a functional group capable of reacting with a benzyl halide or a vinyl sulfone group in the cross-linker.

72. A membrane according to any one of paragraphs 46 to 71, wherein the cross-link modifier is the residue of a cross-link modification agent comprising a nucleophilic functional group.

73. A membrane according to any one of paragraphs 46 to 72, wherein the cross-link modifier is the residue of a cross-link modification agent comprising a functional group selected from an amine, a thiol, a thiolate, a phenoxide, a carboxylate, a hydroxylamine, a oximate, a hydrazine, a hydrazone, an imide and a hydrazide.

74. A membrane according to any one of paragraphs 46 to 73, wherein the cross-link modifier is the residue of a cross-link modification agent comprising an amine.

75. A membrane according to any one of paragraphs 46 to 74, wherein the cross-link modifier is the residue of a cross-link modification agent selected from alkyl or dialkyl amines, amino steroids, amino glycosides, amino acids, polyaminoacids, amino lipids, amino aromatic and heteroaromatic nuclei.

76. A membrane according to any one of paragraphs 46 to 75, wherein the cross-link modifier is the residue of a cross-link modification agent selected from a 01-6 alkyl or 02-12 dialkyl amine.

77. A membrane according to any one of paragraphs 46 to 74, wherein the cross-link modifier is the residue of a cross-link modification agent which is a polyetheramine.

78. A membrane according to any one of paragraphs 46 to 74, wherein the cross-link modifier is the residue of a cross-link modification agent selected from a polyetheramine (e.g. Jeffamines®), 4-amino-tetraphenylmethane, polyethylene imine, phosphatidyl ethanaolamine, sphingosine, and 3-aminopropyl trimethoxysilane.

79. A membrane according to any one of paragraphs 46 to 73, wherein the cross-link modifier is the residue of a cross-link modification agent which is a thiolate or a thiol.

80. A membrane according to any one of paragraphs 46 to 73 and 79, wherein the cross-link modifier is the residue of a cross-link modification agent selected from a cysteine derivative or an alkyl thiol.

81. A membrane according to any one of paragraphs 46 to 73, wherein the cross-link modifier is the residue of a cross-link modification agent selected from methylamine, ethylamine, dimethylamine, diethylamine, ethanolamine, aniline, alanine, glycine, ammonia, hydroxylamine, hydrazine, hydrogen peroxide, hydrogen sulphide, 2-mercaptoethanol, 2-mercaptoacetic acid, 3-mercaptopropionic acid, and 3-mercaptopropane sulfonate salts.

82. A membrane according to any one of paragraphs 46 to 73, wherein the cross-link modifier is the residue of a cross-link modification agent selected from methylamine, ethylamine, dimethylamine, diethylamine, ethanolamine, aniline, alanine, glycine, ammonia, hydroxylamine, hydrazine, hydrogen peroxide, hydrogen sulphide, 2-mercaptoethanol, 2-mercaptoacetic acid, 3-mercaptopropionic acid, and 3-mercaptopropane sulfonate salts.

83. A membrane according to any one of paragraphs 46 to 82 wherein the cross-link modifier is non-functional.

84. Use of an asymmetric integrally skinned membrane according to any of paragraphs 45 to 82 for filtration of a solution comprising at least one solute.

85. Use of an asymmetric integrally skinned membrane according to any of paragraphs 45 to 82 for nanofiltration of a solution comprising at least one solute.

86. Use of an asymmetric integrally skinned membrane according to any of paragraphs 45 to 82 for ultrafiltration of a solution comprising at least one solute.

87. A method of separating at least one solute present in a solution by filtration, wherein said method comprises/consists of passing the feed through an asymmetric integrally skinned membrane as defined in paragraphs 45 to 82.

88. A method of separating at least one solute present in a solution by ultrafiltration, wherein said method comprises/consists of passing the feed through an asymmetric integrally skinned membrane as defined in paragraphs 45 to 82.

89. A method of separating at least one solute present in a solution by nanofiltration, wherein said method comprises/consists of passing the feed through an asymmetric integrally skinned membrane as defined in paragraphs 45 to 82.

90. A method or use according to any one of paragraphs 84 to 89 wherein the solution comprises at least one organic solvent.

91. A method or use according to any one of paragraphs 84 to 90 wherein the solution is basic.

92. A method or use according to any one of paragraphs 84 to 90 wherein the solution is acidic.

93. A method or use according to any one of paragraphs 84 to 92 wherein the solutes are selected from organic molecules resulting from the synthesis via protecting group chemistry of peptides, peptide nucleic acids, oligonucleotides and oligosaccharides.

94. A method or use according to any one of paragraphs 84 to 92 wherein the solutes are selected from biological polymers, such as peptides, peptide nucleic acids, oligonucleotides, and oligosaccharides.

95. A method or use according to any one of paragraphs 84 to 92 wherein the solutes are selected from a synthetic polymer, such as polyethylene glycol and its derivatives.

96. A method or use according to any one of paragraphs 84 to 92 wherein the solutes are selected from an ionic organic molecule or an organic salt.

EXAMPLES

Membrane Preparation

Integrally skinned asymmetric PBI membranes were prepared by phase inversion.

Stock dopes containing 17 to 22 wt % PBI were prepared by dilution into DMAc of the commercial polymer solution (Celazole® S26 PBI, MW=27,000 g mol$^{-1}$, from PBI Performance Products Inc., USA containing 26 wt % polymer solids and 1.5 wt % lithium chloride (stabiliser) dissolved in dimethylacetamide (DMAc)). To homogenize the PBI solution after dilution, the mixture was stirred continuously at 21±0.5° C. for at least 6 hours. It was then left unstirred for several hours to remove air bubbles.

The dope solution was cast on polypropylene nonwoven support (Novatex 2471). Bench cast membranes were cast with the knife set at 250 μm and the casting machine set at a speed of 3.5 cm s$^{-1}$ (Elcometer, UK). Continuous cast membranes were cast with the knife set at 200 μm and a speed of 3 cm 5$^{-1}$ (SepraTek, Korea).

After the dope solution had been cast, the membranes were immersed in a deionized water bath to effect phase inversion at 21±1° C. Subsequently, the membranes were immersed in isopropanol and the liquid was stirred to leach out residual solvent and water. The IPA was replaced three times.

The cross-linking reaction was run under anhydrous conditions, using MeCN dried over baked 4 Å molecular sieves, and excluding air with a nitrogen atmosphere. The fresh PBI membrane was first immersed in dry MeCN at room temperature (to remove IPA adsorbed during storage), then transferred to a large Pyrex reactor tube (20 cm length, 3.5 cm internal diameter) filled with anhydrous MeCN (150 mL) and fitted with a water-cooled spiral condenser. Solid α,α'-dibromo-p-xylene (DBX) was added directly to the stirred liquid (3 wt % on dissolution) and the reactor was immersed in an oil bath thermostatted at 80° C. for 24 hr.

After cross-linking, the DBX solution was decanted and the PBI-DBX membrane was rinsed twice with anhydrous MeCN. The PBI-DBX was then re-immersed in MeCN (83 mL) to which Jeffamine® (50 mL; M-600, M-1000, M-2005, RE1-2007 (may also be referred to as JM-2007 herein), or XTJ-436, see FIG. 1.) and Hunig's base (17 mL) were added. Alternatively, 4-amino tetraphenylmethane (3 g) was added to a solution of 137 mL of MeCN and 17 mL of Hunig's base. The solution was heated at 80° C. for 24 hr. Finally, the membrane surfaces were rinsed with IPA and the membranes were immersed in a conditioning solution of PEG400-IPA 1:1, stirring continuously for at least 4 hours.

The various membranes according to the invention are denoted based on the concentration of PBI in the dope solution, the type of cross-linking agent used and the type of cross-link modifying agent used. For example, a membrane prepared using a dope solution comprising 18% PBI, a DBX cross-linking agent and a Jeffamine® M-600 cross-link modification agent denoted as PB118-DBX-(M-600). Furthermore, a membrane prepared using a dope solution comprising 18% PBI and a DBX cross-linking agent, but without a cross-link modifying agent is denoted PB118-DBX.

Example 1

The membrane performance was determined by filtration experiments. A laboratory scale cross-flow nanofiltration unit was used with 4 cross-flow cells in series. Membrane discs of active area 14 cm$^2$ were used. An 80 mL feed tank was charged with a feed solution consisting of 0.04 g of tris(dinucleotidyl)hub[1] homostar 1 (see FIG. 2). The feed solution was re-circulated at a flow rate of 60-180 L h$^{-1}$ using a Micropump (GD series, Michael Smith Engineers Ltd., UK). Pressure in the cells was generated using a backpressure regulator which was located down-stream of a pressure gauge. During start-up, the non-reactive conditioning solution was removed by re-circulating pure solvent and discarding the initial permeate. During operation, permeate samples were collected from individual sampling ports for each cross-flow cell and the retentate sample was taken from the recycle line. The solvent flux N$_v$ was calculated from the equation (1):

$$N_v = \frac{V}{At} \quad (1)$$

where V=volume of a liquid sample collected from the permeate stream from a specific cross-flow cell, t=time over which the liquid sample is collected, A=membrane area.

The solute concentrations were measured using an Agilent HPLC machine. A reverse phase column (C18-300, 250 mm×4.6 mm, ACE Hichrom) was used and the mobile phases were MeOH-MeCN 1:4 and DI water buffered with 5 mM ammonium acetate. The HPLC pump flow rate was set at 1 ml min$^{-1}$ and the column temperature was set at 30° C.

Figure 3A:
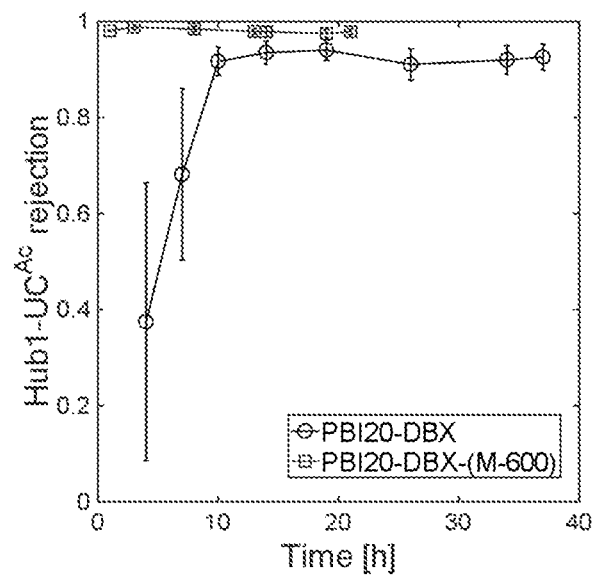
FIG. 3 shows rejection data at 10 bar with a nanofiltration feed stream consisting of a solution of hub1-UC$^{Ac}$-OH (1) dissolved in DMF-MeCN 1:19 for polybenzimidazole membranes prepared from a dope solution containing 20 wt % polybenzimidazole in DMAc, cross-linked with α,α'-dibromo-p-xylene. One membrane was not further modified after crosslinking with DBX (PBI20-DBX), the other membrane was further treated with Jeffamine® M600 as cross-link modification agent (PBI20-DBX-(M-600)). Graph (a) rejection of hub1-UC$^{Ac}$-OH; Graph (b) permeance.
Figure 3B:
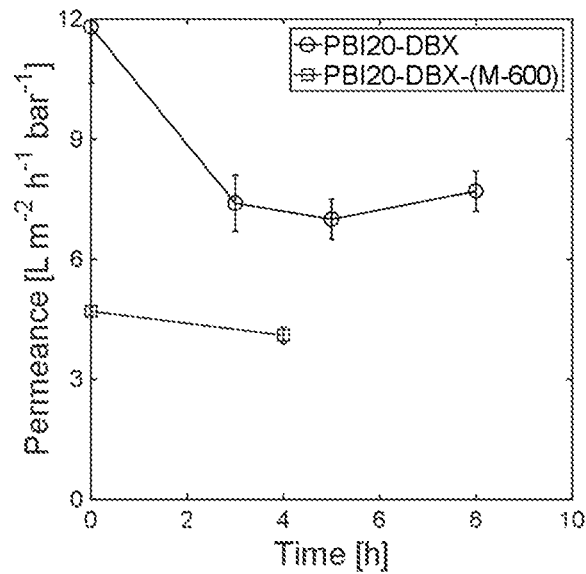
Figure 4A:
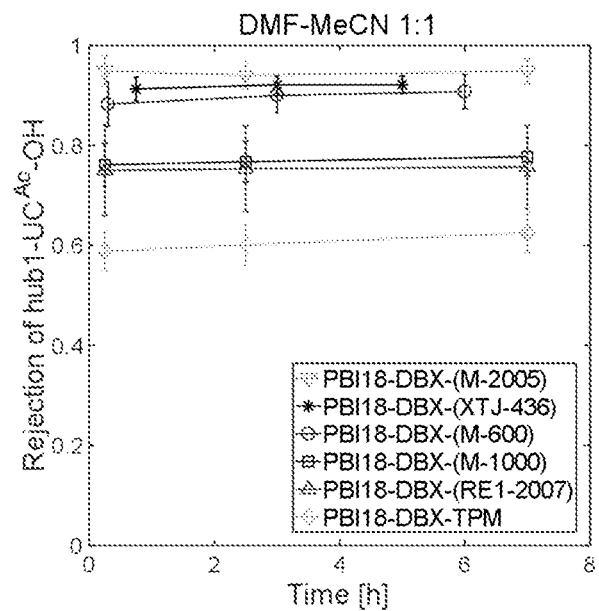
FIG. 4 shows rejection data at 10 bar with a nanofiltration feed stream consisting of a solution of hub1-UC$^{Ac}$-OH (1) or hub1-UC$^{Ac}$c$^{Ac}$A$^{Bz}$U-OH (2)+neutral tri-ester guanine nucleotide (5) dissolved in DMF-MeCN 1:1, for various polybenzimidazole membranes prepared from a dope solution containing 18 wt % polybenzimidazole in DMAc, cross-linked with α,α'-dibromo-p-xylene, and treated with a range of Jeffamine polyetheramines and 4-amino-tetraphenylmethane (TPM-NH$_2$) as cross-link modification agents. (a) Rejection of hub1-UC$^{Ac}$-OH (1); (b) Rejection of neutral tri-ester guanine nucleotide (5) in solution with hub1-UC$^{Ac}$-OH (1); (c) Rejection of hub1-UC$^{Ac}$C$^{Ac}$A$^{Bz}$U-OH (2); (d) Rejection of neutral tri-ester guanine nucleotide (5) in solution with hub1-UC$^{Ac}$C$^{Ac}$A$^{Bz}$U-OH (2); (e) Permeance.
Figure 4B:
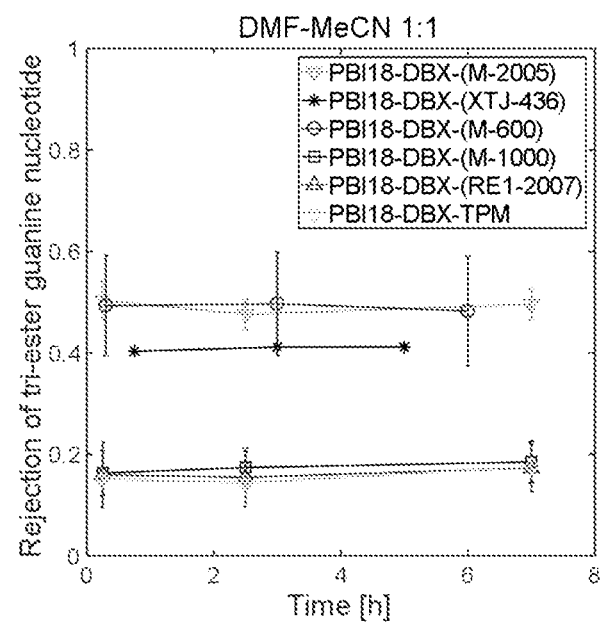
Figure 4C:
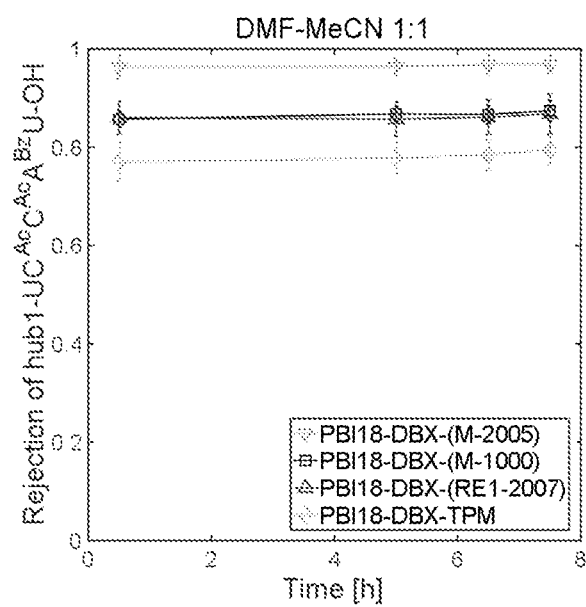
Figure 4D:
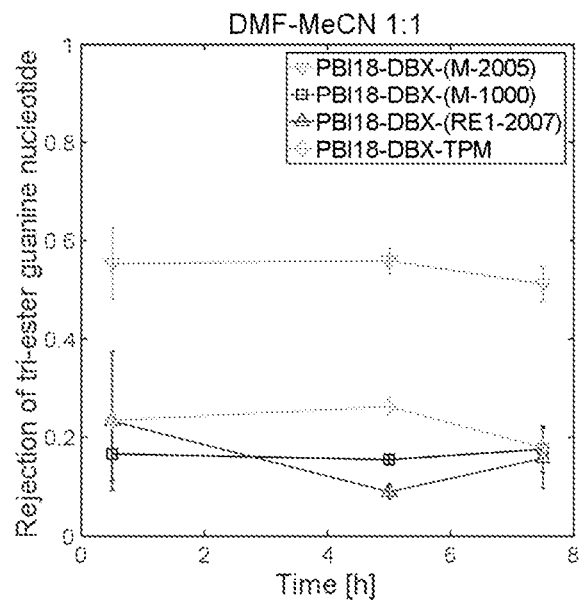
Figure 4E:
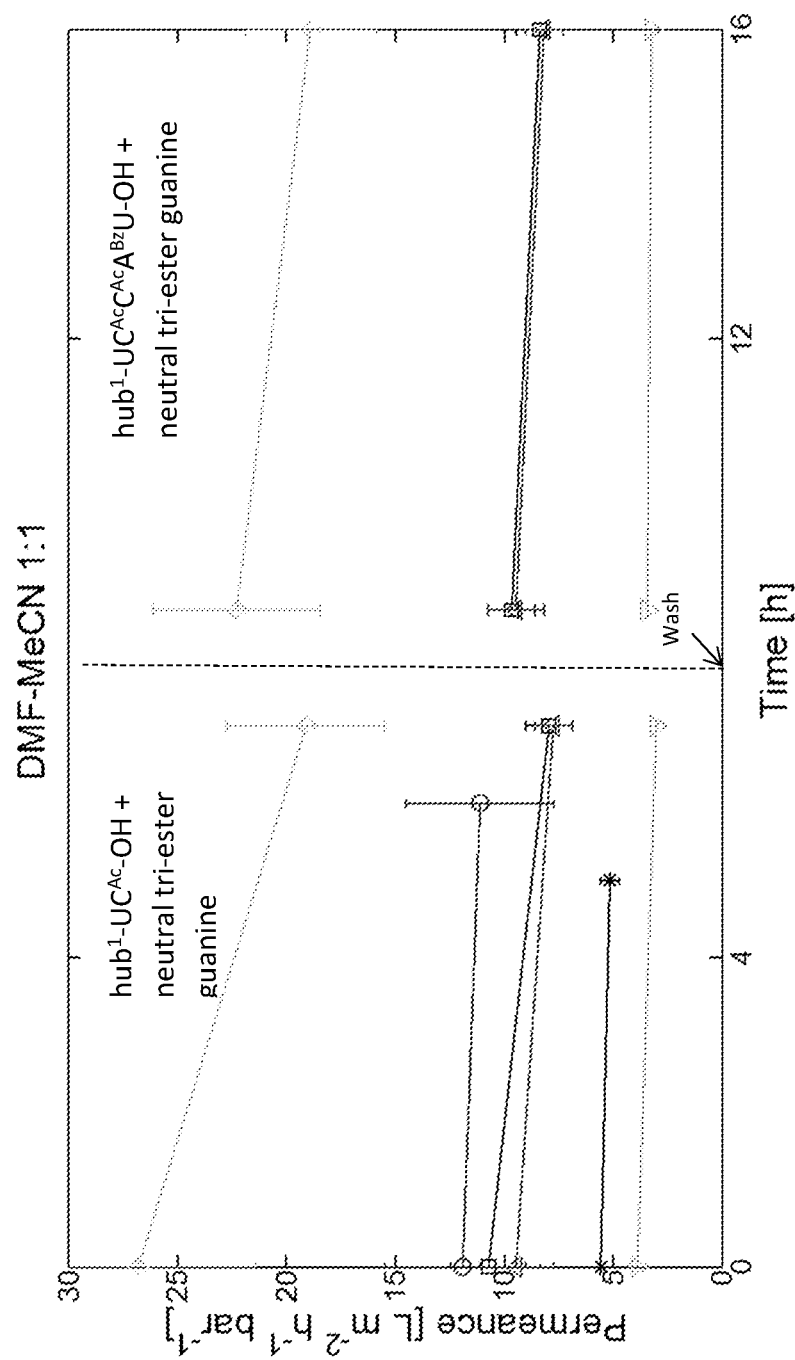

Membranes were cast as described above, using a dope solution of 20% PBI in DMAc. Permeance and rejection data are reported in FIG. 3. The Jeffamine-M600 modified membrane shows stable performance with time, but the unmodified membrane's performance changes from the initial time of operation.

Example 2

A laboratory scale cross-flow nanofiltration unit was used with 4 cross-flow cells in series. Membrane discs of active area 14 cm$^2$ were used. An 80 mL feed tank was charged with a feed solution consisting of 0.04 g of tris(dinucleotidyl)hub[1] homostar 1 or 0.06 g tris(pentanucleotidyl)hub[1] homostar 2 with 0.02 g neutral tri-ester guanine nucleotide 5 (see FIG. 2). The feed solution was re-circulated at a flow rate of 60-180 L h$^{-1}$ using a Micropump (GD series, Michael Smith Engineers Ltd., UK). Pressure in the cells was generated using a backpressure regulator which was located down-stream of a pressure gauge. During start-up, the non-reactive conditioning solution was removed by re-circulating pure solvent and discarding the initial permeate. During operation, permeate samples were collected from individual sampling ports for each cross-flow cell and the retentate sample was taken from the recycle line. Solvent flux was calculated as in Equation 1. The solute concentrations were measured using an Agilent HPLC machine. A reverse phase column (C18-300, 250 mm×4.6 mm, ACE Hichrom) was used and the mobile phases were MeOH-MeCN 1:4 and DI water buffered with 5 mM ammonium acetate. The HPLC pump flow rate was set at 1 ml min$^{-1}$ and the column temperature was set at 30° C.

Membranes were cast as described above, using a dope solution of 18% PBI in DMAc and modified using the different modifiers listed in FIG. 1. Permeance and rejection data are reported in FIG. 4.

Example 3

A laboratory scale cross-flow nanofiltration unit was used with 4 cross-flow cells in series. Membrane discs of active area 14 or 54 cm$^2$ were used. An 80 mL feed tank was charged with a feed solution consisting of 0.04 g of tris (dinucleotidyl)hub[1] homostar 1, 0.02 g of charged guanine nucleotide 3 and/or 0.02 g of neutral guanine nucleotide 4 (see FIG. 2). The feed solution was re-circulated at a flow rate of 60-180 L h$^{-1}$ using a Micropump (GD series, Michael Smith Engineers Ltd., UK). Pressure in the cells was generated using a backpressure regulator which was located down-stream of a pressure gauge. During start-up, the non-reactive conditioning solution was removed by re-circulating pure solvent and discarding the initial permeate. During operation, permeate samples were collected from individual sampling ports for each cross-flow cell and the retentate sample was taken from the recycle line. Solvent flux was calculated as in Equation 1. The solute concentrations were measured using an Agilent HPLC machine. A reverse phase column (C18-300, 250 mm×4.6 mm, ACE Hichrom) was used and the mobile phases were MeOH-MeCN 1:4 and DI water buffered with 5 mM ammonium acetate. The HPLC pump flow rate was set at 1 ml min$^{-1}$ and the column temperature was set at 30° C.

Membranes were cast as described above. The performance of the different membranes was assessed. Additionally, the performance of these membranes was tested after exposing them to acidic solutions [dichloroacetic acid (DCA), or methanesulfonic acid (MSA) in DMF-MeCN 1:20] and basic solutions [pyridine or 1-methylimidazole (NMI) in DMF-MeCN 1:20] for 30-60 minutes. Both acidic and basic solutions were thoroughly rinsed from the membranes prior to testing. Permeance and rejection data are reported in Table 1. It was observed that rejection is higher for the membranes prepared using a higher concentration of PBI in the dope solution (i.e. tighter membranes). Rejection of the bigger tris(dinucleotidyl) hub1 homostar is always higher than rejection of the smaller guanine nucleotide. The rejection of neutral guanine nucleotide is higher than the rejection of charged guanine nucleotide, due to the lower affinity of the former for the charged membrane. Rejection is higher for membranes modified with longer Jeffamines® (M-2005 and RE1-2007) with respect to membranes modified with shorter M-600 or TPM.

TABLE 1

Permeance and rejection data of tris(dinucleotidyl)hub[1] homostar (1), charged guanine nucleotide (3) and neutral guanine nucleotide (4) at steady state (see FIG. 3) in DMF—MeCN 1:19.

| Membrane code | Rejection of charged guanine nucleotide, 3 [%] | Rejection of tris(di-nucleotidyl) hub[1] homostar, 1 [%] | Rejection of neutral guanine nucleotide, 4 [%] | Permeance [L m$^{-2}$ h$^{-1}$ bar$^{-1}$] |
|---|---|---|---|---|
| No pre-treatment | | | | |
| PBI17-DBX-(M-600) | n.a. | 86 ± 6 | 73 ± 7 | 6.1 ± 0.5 |
| PBI18-DBX-(M-600) | 69.6 ± 8.3 | 90.5 ± 5.2 | 83.5 ± 6.5 | 6.4 ± 1.2 |
| PBI18-DBX-(M-600) | n.a. | 92.1 ± 0.8 | 65.3 ± 1.0 | 13.5 ± 1.5 |
| PBI19-DBX-(M-600) | n.a. | 98.9 ± 0.3 | 87.3 ± 3.2 | 6.6 ± 1.0 |
| PBI20-DBX-(M-600) | 75.5 ± 1.2 | 98.4 ± 0.8 | 83.8 ± 0.2 | 4.1 ± 0.3 |
| After exposing the membrane to MSA, followed by NMI | | | | |
| PBI18-DBX-(M-600) | 86.1 ± 0.4 | 92.8 ± 2.6 | 91.1 ± 1.9 | 4.2 ± 0.6 |
| PBI18-DBX-(M-2005) | 73.6 ± 11.0 | 96.5 ± 1.7 | 91.5 ± 4.8 | 4.1 ± 0.8 |
| PBI18-DBX-(RE1-2007)(*) | 79.7 ± 1.3 | 96.3 ± 2.4 | 91.9 ± 0.3 | 3.9 ± 1.7 |
| PBI18-DBX-TPM(*) | 61.3 ± 0.3 | 92.3 ± 0.2 | 89.3 ± 0.1 | 8.4 ± 0.9 |
| After exposing the membrane to DCA, followed by pyridine | | | | |
| PBI18-DBX-TPM | n.a. | 84.3 ± 4.7 | 72.2 ± 7.7 | 9.4 ± 4.3 |
| PBI19-DBX-TPM | n.a. | 89.4 ± 2.8 | 75.4 ± 3.4 | 7.7 ± 1.2 |
| PBI17-DBX-(M-600) | 29.1 ± 11.8 | 71.9 ± 7.7 | 44.4 ± 15.9 | 3.6 ± 0.1 |
| PBI18-DBX-(M-600) | 53.9 ± 3.4 | 92.4 ± 2.2 | 74.1 ± 0.2 | 3.0 ± 0.9 |
| PBI19-DBX-(M-600) | 60.4 ± 4.9 | 96.8 ± 0.9 | 82.3 ± 1.5 | 2.3 ± 0.1 |

Example 4

A laboratory scale cross-flow nanofiltration unit was used with 8 cross flow cells in series. Membrane discs of active area 14 cm$^2$ were used. A 2 L feed tank was charged with a feed solution consisting of 1 g of styrene oligomers of nominal molecular weight 580 g mol$^{-1}$ and 1 g of styrene oligomers of nominal molecular weight 1000 g mol$^{-1}$ (Agilent) and 0.1 g of α-methylstyrene dimer (Sigma Aldrich, UK); the styrene oligomers were all fully soluble at the concentrations tested for these solvents. The feed solution was re-circulated at a flow rate of 150 L h$^{-1}$ using a diaphragm pump (Hydra-Cell, Wanner, USA). Pressure in the cells was generated using a backpressure regulator which was located down-stream of a pressure gauge. The re-circulating liquid was kept at 30° C. by a heat exchanger. During start-up, the non-reactive conditioning solution was removed by re-circulating pure solvent and discarding the initial permeate. During operation, permeate samples were collected from individual sampling ports for each cross-flow cell and the retentate sample was taken from the feed tank. The solvent flux $N_v$ was calculated from the equation as in Equation 1. Polystyrene rejection was measured using an Agilent HPLC machine. A reverse phase column (C18-300, 250 mm×4.6 mm, ACE Hichrom) was used and the mobile phases were 1v % TFA-THF and 1v % TFA-DI water. The HPLC pump flow rate was set at 1 ml min$^{-1}$ and the column temperature was set at 30° C.

Figure 5:
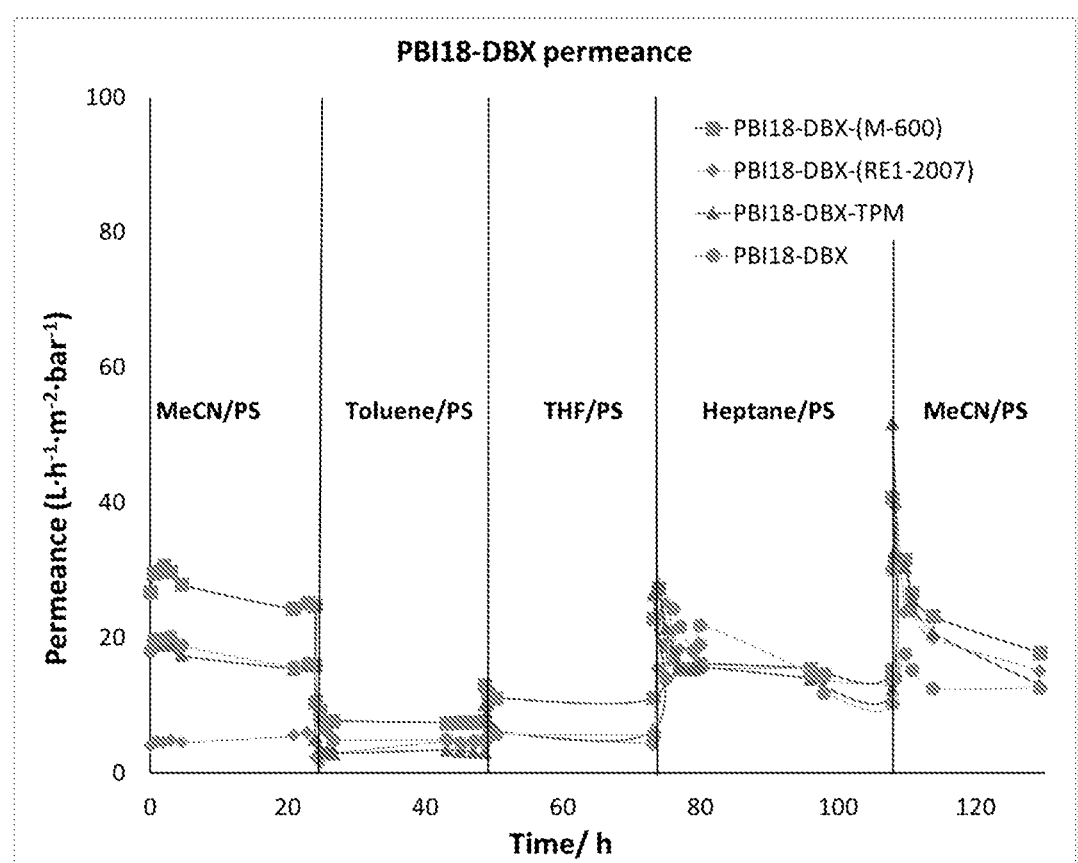
FIG. 5 shows permeance at 10 bar with a nanofiltration feed stream comprising polystyrene oligomers as solutes dissolved in a range of organic solvents, for various polybenzimidazole membranes prepared from a dope solution containing 18 wt % polybenzimidazole in DMAc, cross-linked with α,α'-dibromo-p-xylene, and treated with a variety of polyetheramines and 4-amino-tetraphenylmethane as cross-link modification agents.
Figure 6:
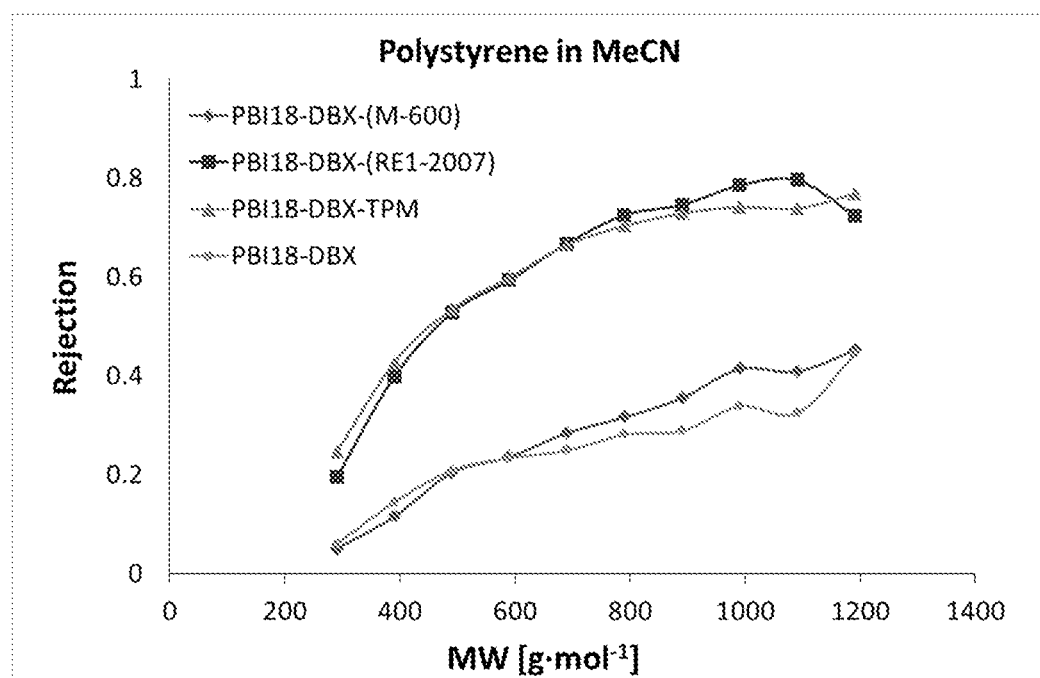
FIG. 6 shows rejection data at 10 bar with a nanofiltration feed stream comprising polystyrene oligomer solutes dissolved in acetonitrile, for various polybenzimidazole membranes prepared from a dope solution containing 18 wt % polybenzimidazole in DMAc, cross-linked with α,α'-dibromo-p-xylene, and treated with a range of polyetheramines and 4-amino-tetraphenylmethane as reactive modification agents.

Membranes were cast as explained above. Different solvents were tested, in the order: MeCN, toluene, THF, heptane, and again MeCN (repeat). Permeance and rejection data for the different solvents are shown in FIGS. 5 and 6. Flux and rejection change with the modifying agent. In MeCN, the rejection of the unmodified membrane and the membrane modified with shorter M-600 are lower than the rejection of the membranes modified with a longer RE1-2007 or a more hydrophobic TPM. Permeance is higher in MeCN and lower in toluene for all membranes.

Example 5

A laboratory scale cross-flow nanofiltration unit was used with 4 cross flow cells in series. Membrane discs of active area 14 or 54 cm$^2$ were used. An 80 mL feed tank was charged with a feed solution consisting of 0.0015 g/ml TsOEg$_4$OThp 6 or 0.0012 g/ml TsOEg$_4$OCH(Octyl)CH$_2$OThp 7 and 0.0004 g/ml Hub$^3$[OEg$_{12}$ OCH(Octyl)CH$_2$OThp]$_3$ 8 (FIG. 7) in methanol and re-circulated at a flow rate of 60-180 L h$^{-1}$ using a Micropump (GD series, Michael Smith Engineers Ltd., UK).

Pressure in the cells was generated using a backpressure regulator which was located down-stream of a pressure gauge. During start-up, the non-reactive conditioning solution was removed by re-circulating pure solvent and discarding the initial permeate. During operation, permeate samples were collected from individual sampling ports for each cross-flow cell and the retentate sample was taken from the recycle line. Solvent flux was calculated as in Equation 1. The solute concentrations were measured using an Agilent HPLC machine. A reverse phase column (C18-300, 250 mm×4.6 mm, ACE Hichrom) was used and the mobile phases were MeOH-MeCN 1:4 and DI water buffered with 5 mM ammonium acetate. The HPLC pump flow rate was set at 1 ml min$^{-1}$ and the column temperature was set at 30° C.

Membranes were cast as described above. Permeance and rejection are reported in Table 2. Rejection is higher and permeance lower for the membranes modified with longer Jeffamines® (M-2005 or RE1-2007), with respect to the membranes modified with shorter M-600. Rejection is lower for the membrane cast from a dope composition with higher concentration of PBI (19% vs. 18%).

TABLE 2

Permeance and rejection data of TsOEg$_4$OThp 6, TsOEg$_4$OCH(Octyl)CH$_2$OThp 7, and Hub$^3$[OEg$_{12}$OCH(Octyl)CH$_2$OThp]$_3$ 8 in methanol.

| Membrane code | TsOEG$_4$OThp 6 | | TsOEG$_4$OCH(Octyl)CH$_2$OThp 7 and Hub$^3$(OEG$_{12}$ OCH(Octyl)CH$_2$OThp)$_3$ 8 | | |
|---|---|---|---|---|---|
| | Rejection | Permeance [L m$^{-2}$ h$^{-1}$ bar$^{-1}$] | Rejection of compound 7 | Rejection of compound 8 | Permeance [L m$^{-2}$ h$^{-1}$ bar$^{-1}$] |
| PBI18-DBX-(M-600) | n.a. | n.a. | 16.9 ± 0.1 | 53.5 ± 0.3 | 12.2 ± 2.2 |
| PBI18-DBX-(M-2005) | 28.9 ± 0.0 | 4.6 ± 0.2 | 45.4 ± 0.1 | 82.9 ± 0.0 | 5.3 ± 0.1 |
| PBI18-DBX-(RE1-2007) | 43.9 ± 0.0 | 3.2 ± 0.1 | 66.0 ± 0.1 | 94.2 ± 0.0 | 3.4 ± 0.1 |
| PBI19-DBX-(M-600) | n.a. | n.a. | 29.5 ± 0.1 | 49.92 ± 0.0 | 16.3 ± 0.3 |

Example 6

Membrane Preparation

Integrally skinned asymmetric PBI membranes were prepared by phase inversion. 18 wt % stock dope was prepared by dilution of the commercial PBI solution (26 wt %) into DMAc. To homogenize the PBI solution after dilution, the mixture was stirred continuously at 21±0.5° C. for at least 6 hours. The solution was then left unstirred for several hours to remove air bubbles.

PBI membrane was cast on polypropylene nonwoven support (Novatex 2471), using a continuous casting machine (SepraTek, Korea) with the casting knife set at 200 μm and the casting speed set at 2.2 cm s$^{-1}$. The water bath temperature for the phase inversion was set at 20° C. Subsequently, the membrane was rolled up, immersed in IPA or MeCN in large measuring cylinders, and the liquid was stirred to leach out residual solvent and water. The washing solvent was replaced three times.

Membrane cross-linking reaction was run under anhydrous conditions, using MeCN dried over baked 4 Å molecular sieves, and excluding air with a nitrogen atmosphere. The fresh PBI membrane was first immersed in MeCN at room temperature (to remove the washing solvent adsorbed during storage), then transferred to a large Pyrex tube filled with anhydrous MeCN (150 mL) and fitted with a water-cooled spiral condenser. Solid DBX was added directly to the stirred liquid (3 wt % on dissolution) and the ensemble was immersed in an oil bath thermostatted at 80° C. for 24 hr.

At the end of the reaction, the cross-linking apparatus was allowed to cool to room temperature and the membrane surface was rinsed with MeCN to remove excess cross-linking solution. The membrane was then immersed in MeCN in large measuring cylinders, and stirred to remove residual DBX. The membranes were finally either kept in MeCN until further use or immersed in a solution of PEG400-IPA 1:1, stirring continuously for at least 4 hours. This procedure impregnated the membrane with PEG400 to preserve the pore structure, after which they could be dried in a fume hood and stored.

After cross-linking PBI for 24 h with DBX in MeCN as above, the DBX solution was decanted and the PBI-DBX membrane was rinsed twice with anhydrous MeCN. The PBI-DBX was then re-immersed in MeCN (83 mL) to which 50 mL of crosslink modification agents mono-amine Jeffamine® (M-600, M-1000, M-2005 or XTJ-436) or Elastamine® (RE1-2007) (see FIG. 1) were added in the presence of Hunig's base (17 mL). Heating at 80° C. and stirring were continued for a further 24 hr after which they were impregnated with a preserving agent by PEG400.

A similar reaction was also performed using mono-amino tetraphenylmethane (TPM-$NH_2$) and MeCN (150 mL). The protonation level of the membrane was adjusted by washing the membrane in 0.5% v methane sulfonic acid (MsOH) in DMF-MeCN 1:1 (acid wash), followed by 2% 1-methylimidazole (NMI) or 3-picoline in DMF-MeCN 1:1 (basic wash).

Membrane Performance

Polymeric flat sheets of PBI-DBX were tested in a multi-cell cross-flow rig, operated at a pressure of 10 bar at room temperature. A Micropump (Michael Smith Engineers Ltd.) was used to provide flow rates of 100-150 L $h^{-1}$. Each membrane disk had an effective area of 14 $cm^2$ or 54 $cm^2$. Two to six disks of each membrane were used to verify membrane reproducibility.

Permeance, B [L $m^{-2}$ $h^{-1}$ $bar^{-1}$], and rejection of species i, Ri, were measured at different time points. These were calculated using Equations 1 and 2 respectively:

$$B = \frac{V}{A \cdot t \cdot \Delta p} \quad \text{Equation 1}$$

$$Ri = 1 - \frac{c_{P,i}}{c_{R,i}} \quad \text{Equation 2}$$

where V is the volume collected, A is the effective membrane area, t is the time over which the sample is collected, $\Delta p$ is the applied trans-membrane pressure, and $c_{P,i}$ and $c_{R,i}$ represent the concentration of solute i in the permeate and the retentate, respectively.

The filtration test for polyethylenglycol (PEG) in different solvents used 1 g $L^{-1}$ PEG of each three different molecular weights (400, 2000 and 8000 g $mol^{-1}$). The filtration test for polystyrene (PS) in different solvents used 0.5 g $L^{-1}$ PS of different nominal molecular weights (from 580 to 1300 g $mol^{-1}$). The membranes were also characterised using Hub-$UC^{4c}$-OH dinucleotidyl homostar 1 and guanosine tri-ester building block (see FIG. 2). Hub-$UC^{4c}$-OH dinucleotidyl homostar and guanosine building block were tested in DMF-MeCN 1:1.

The samples were collected from both retentate and permeance streams. An Agilent HPLC coupled to an evaporative light scattering detector (ELSD, Varian-385) was used to analyse PEG, PS and nucleotide samples. A reverse phase column (C18-300, 250 mm×4.6 mm, ACE Hichrom) was used. The mobile phases were MeCN-methanol 1:4 and DI water buffered with 0.1M ammonium acetate for PEG and nucleotide samples, and THF and water for PS samples. The HPLC pump flow rate was set at 1 ml $min^{-1}$ and the column temperature was set at 30° C. The ELSD evaporator was set at 40° C. and the nebulizer at 55° C. Nitrogen gas was supplied to the detector at a flow rate of 1.5 SLM.

Figure 8:
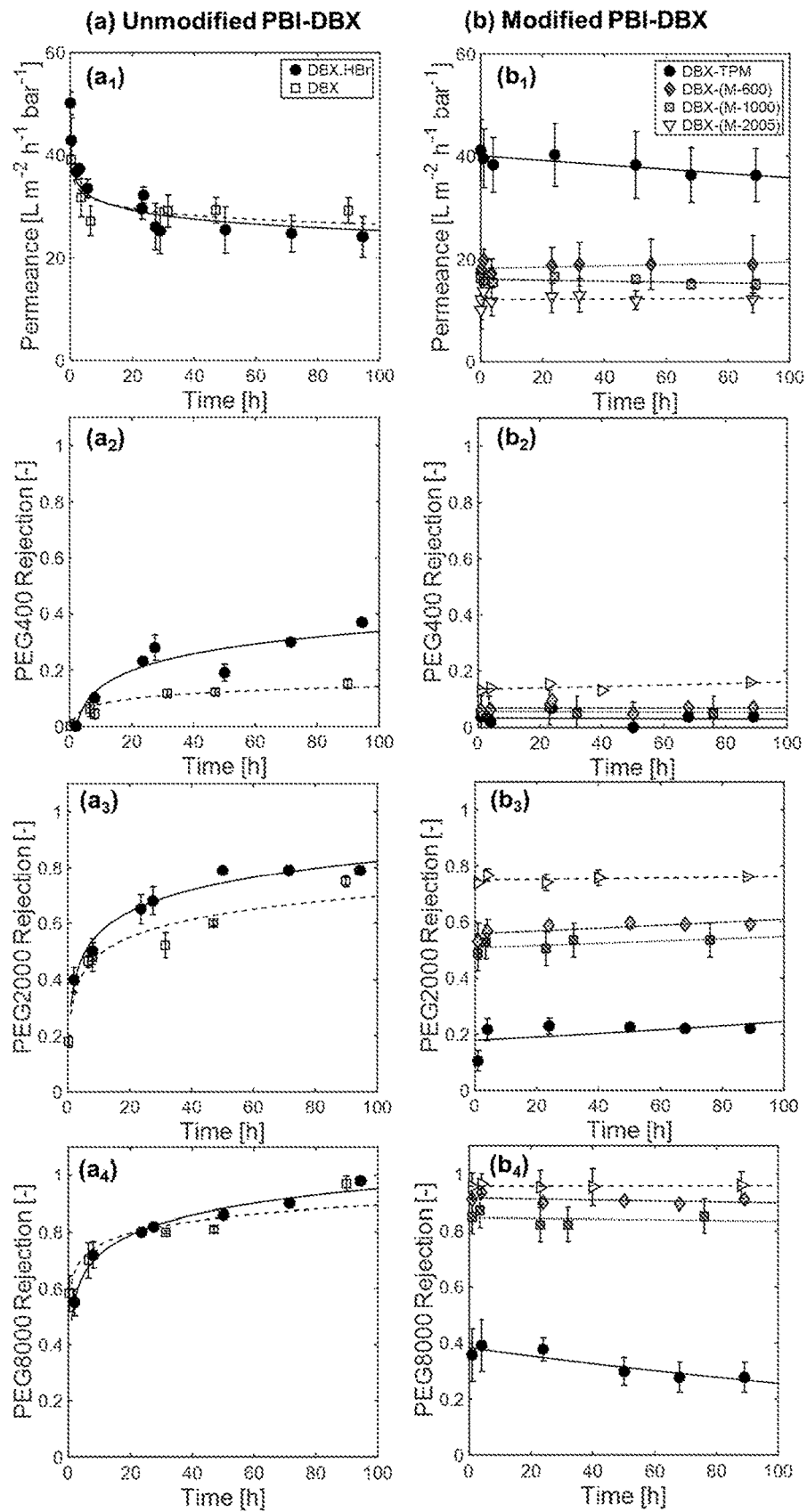
FIG. 8 shows the performance of (a) unmodified and (b) modified PBI membranes in a mixture of PEG (400, 2000 and 8000 g mol$^{-1}$) in MeCN at 10 bar and 150 L h$^{-1}$. (a1,b1) Permeance; (a2,b2) PEG400 rejection; (a3,b3) PEG2000 rejection; (a4,b4) PEG8000 rejection. "DBX.HBr" refers to the unmodified membrane used directly after DBX cross-linking, while "DBX" refers to the unmodified membrane soaked in MeCN-Hunig's base for 24 h at 80° C. The treatment with Hunig's base removes HBr from the membrane surface.

The performance of the membranes modified with mono-amine Jeffamines® is significantly different from the performance of the unmodified PBI-DBX membranes (see FIG. 8). Permeance and PEG rejection are constant over a period of 100 hours. Performance varies with the crosslink modification agent used to treat the membrane. Membranes treated with TPM show higher permeance and lower rejection of all solutes, while the effect of Jeffamine/Elastamine length is evident: the longest Jeffamine M-2005 gives the tightest membrane, and the shortest Jeffamine M-600 gives a more open membrane. M-1000 shows intermediate behavior.

Elemental Analysis

Samples of membranes were washed with MeCN three times, in order to remove all preserving agent from the pores. The PBI layer was then removed from the polypropylene support and collected in small pieces in a glass vial. The samples were then dried in the glass vial under vacuum overnight. The percentage of carbon (C), nitrogen (N), hydrogen (H) and bromine (Br) content in the polymer was measured via elemental analysis by Warwick Analytical Services.

The difference in physico-chemical properties between the modified and the unmodified membranes were evaluated in terms of elemental analysis (CHN and Br content) (see Table 3), specific weight gain, thickness and zeta potential.

TABLE 3

Elemental analysis (C, H, N and Br) of modified and unmodified membranes. "DBX.HBr" refers to the unmodified membrane used directly after DBX crosslinking, while "DBX" refers to the unmodified membrane soaked in MeCN-Hunig's base for 24 h at 80° C.

| Membrane | C %/ atom fraction | H %/ atom fraction | N %/ atom fraction | Br %/ atom fraction | Residual (assumed O %) |
|---|---|---|---|---|---|
| PBI18-DBX.HBr | 57.70<br>1.0 | 4.50<br>0.94 | 9.93<br>0.15 | 19.84<br>0.052 | 8.03<br>0.10 |
| PBI18-DBX | 68.06<br>1.0 | 5.32<br>0.94 | 10.72<br>0.14 | 6.69<br>0.015 | 9.21<br>0.10 |
| PBI18-DBX-TPM | 69.53<br>1.0 | 5.73<br>0.99 | 8.28<br>0.10 | 3.57<br>0.008 | 12.89<br>0.14 |
| PBI18-DBX-(M-1000) | 66.87<br>1.0 | 5.94<br>1.07 | 8.24<br>0.11 | 2.84<br>0.006 | 16.11<br>0.18 |
| PBI18-DBX-(M-2005) | 68.17<br>1.0 | 6.20<br>1.09 | 9.54<br>0.12 | 2.32<br>0.005 | 13.77<br>0.15 |

From the elemental analysis results reported in Table 3, it can be observed that the H/C ratio of DBX.HBr and DBX membranes is the same (0.94). This is expected from the fact that the only difference between these two membranes is the wash with Hunig's base for the DBX membrane, which can remove HBr from the PBI backbone, but has almost no effect on the H/C ratio.

The H/C ratio is higher for the TPM modified membrane (0.99), and even higher for the Jeffamine® modified membranes (1.07-1.09). This is explained by the high H/C ratio of the modifiers, which are now part of the membrane, and therefore accounted for in the overall elemental analysis.

The N/C ratio is lower for the modified membranes (0.10-0.12) than for the modified membranes (0.14-0.15), as the modification with either TPM or Jeffamines does not introduce any significant N (only the N of the reactive mono-amine group is introduced, together with a much larger amount of C atoms).

The amount of Br in the DBX.HBr (not washed with Hunig's base) is the highest (0.052). The Br is present as either dangling Br or as a Br salt on the backbone. When the membrane is washed with Hunig's base, the Br present as salt on the backbone is washed away.

From the elemental analysis of Table 3, it appears that 70% of the Br is lost (the Br content of the DBX membrane is reduced to 0.015). After reacting the membrane with TPM the Br content is halved (0.008), and after reaction with Jeffamines® it is reduced to a third (0.05-0.006). The residual Br is either from incomplete surface modification, or from incomplete Br removal from the backbone.

The oxygen value in Table 3 is calculated as the remaining atom percentage (% O=1-% C-% H-% N-% Br). This assumption may not be accurate, if impurities are present, and the absolute value could be biased by the adsorption of water from the air during sample preparation and analysis.

Weight Change

Samples of membranes with an area of 2.5 cm$^2$ were washed with MeCN three times, dried under vacuum overnight and then weighed using an analytical balance. Three samples were weighted per type of membrane, including the unmodified membrane as an internal standard. Three samples of polypropylene were also weighted and their average specific weight [mg cm$^{-2}$] subtracted from the specific weight of the PBI membranes.

Figure 9:
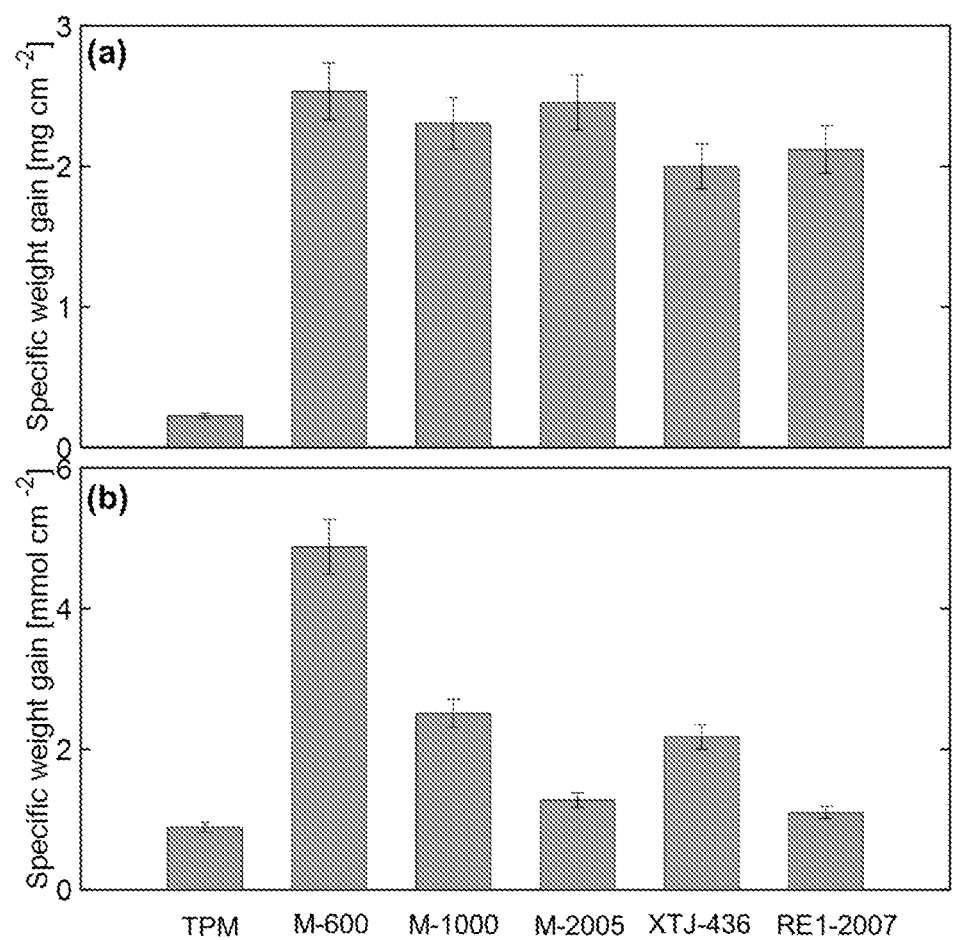
FIG. 9 shows the effect of treatment with cross-link modification agent on membrane specific weight gain: (a) in mg cm$^{-2}$ and (b) mmol cm$^{-2}$.

Specific weight gain (see FIG. 9) shows a smaller increase in mass per unit area [mg cm$^{-2}$] for the TPM modified membrane and a more significant specific mass increase for the Jeffamine®/Elastamine® modified membranes (see FIG. 9(a)). Interestingly, when the weight gain is converted from mg cm$^{-2}$ to mmol cm$^{-2}$ (FIG. 9(b)), a dependence on the type of modification agent is observed. Specifically, the length of the modifier inversely affects the molar weight gain.

Scanning Electron Microscopy

The cross-section of PBI membranes was characterized by scanning electron microscopy (SEM) with a high-resolution field emission gun scanning electron microscope (Carl Zeiss Ltd.) operating at 5 kV. Prior to imaging, samples were freeze-fractured in liquid nitrogen and then coated with 20 nm chromium under an argon atmosphere to achieve the necessary conductivity.

Figure 10:
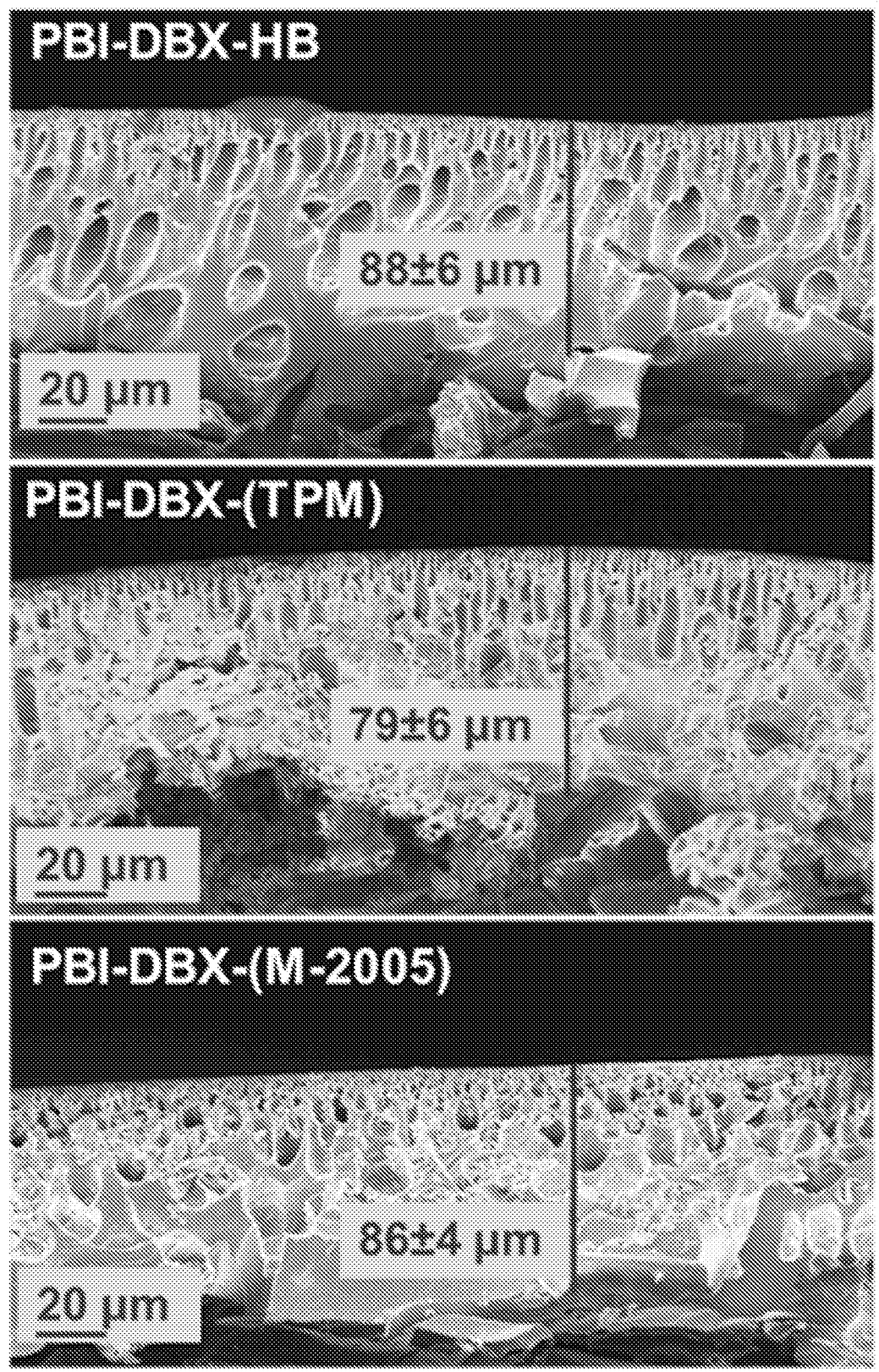
FIG. 10 shows the effect of treatment with cross-link modification agent on membrane thickness.

Treatment with crosslink modification agent after DBX crosslinking did not affect the membrane thickness, as shown in FIG. 10.

Zeta-Potential and Isoelectric Point

The zeta potential of the membrane was obtained via streaming potential measurement on an EKA III (A. Paar) instrument. Ag/AgCL electrodes were used to measure the potential. The pressure drop in the cell was measured with a piezoresistive pressure transducer. The samples were inserted in the system dry and rinsed with water before the measurement. Conductivity and pH were also measured for each experiment. A titration unit was used to vary the pH in the measurement cell, from 4.5 to 10.9. Membrane samples were rinsed with MeCN and then dried at room temperature, prior to the zeta-potential measurement.

Figure 11:
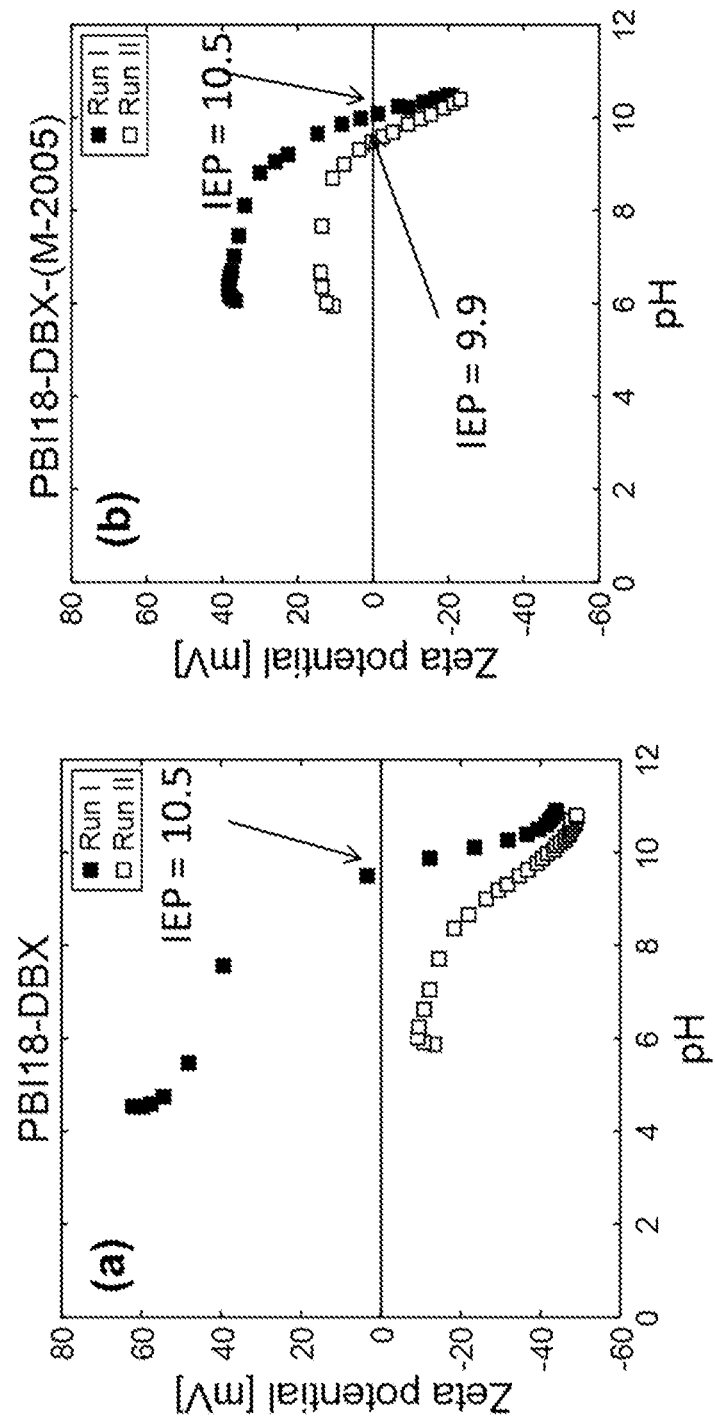
FIG. 11 shows the effect of surface modification on zeta potential and isoelectric point, IEP. (a) Unmodified membrane; (b) membrane modified with Jeffamine M-2005.

The isoelectric point (IEP) of unmodified PBI membranes was measured at pH=10.5 (see FIG. 11(a)). No effect of modification was observed on IEP (cf. FIGS. 11(a) and 11(b)).

Figure 12:
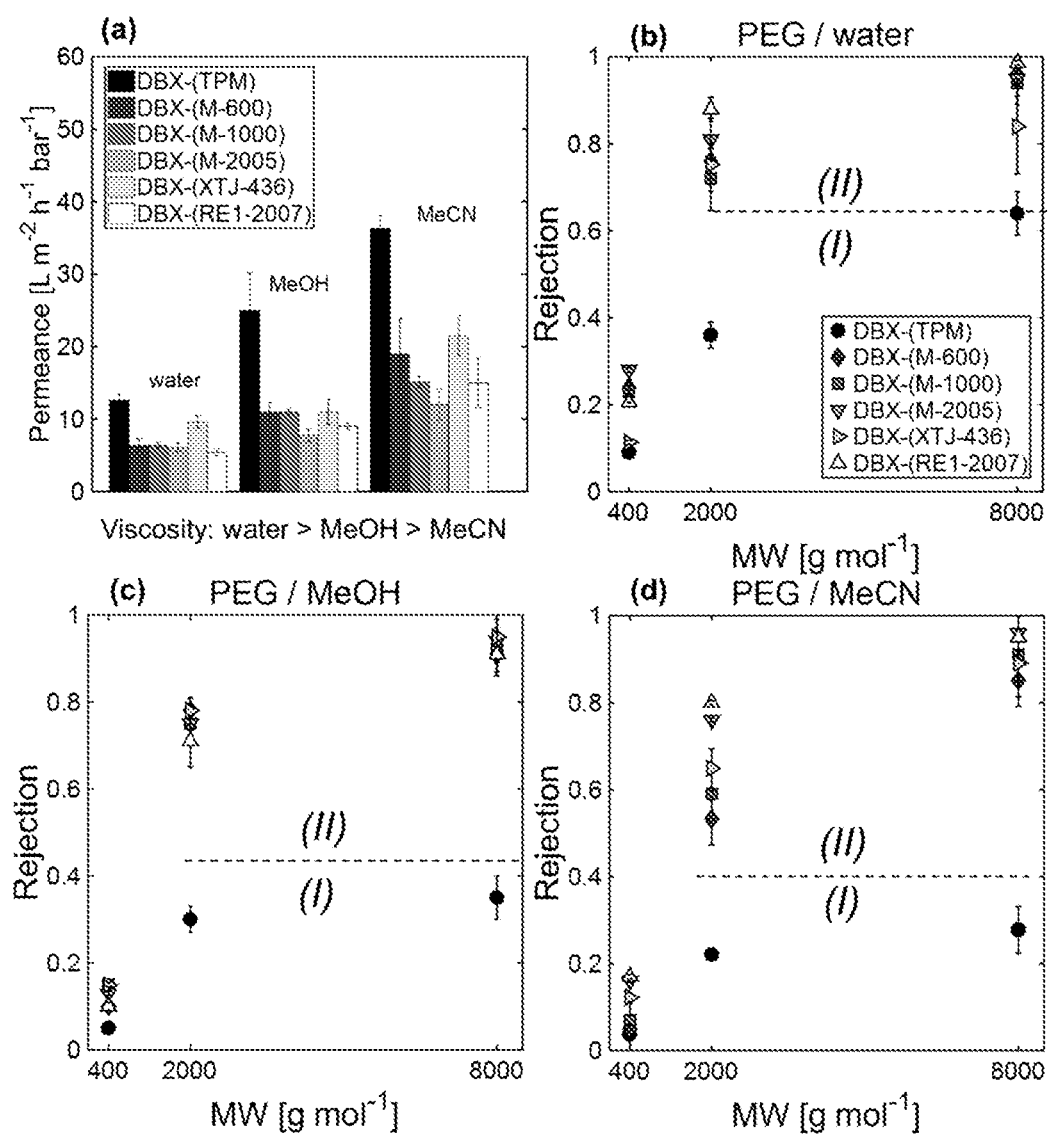
FIG. 12 shows permeance and PEG rejection data of modified PBI membranes. (a) Permeance and trend with solvent viscosity; (b) Rejection of PEGs in water; (c) Rejection of PEGs in MeOH; (d) Rejection of PEGs in MeCN. Region (I): small, rigid, hydrophobic crosslink modification agent. Region (II): crosslink modification agents of different lengths and hydrophilicity.
Figure 13:
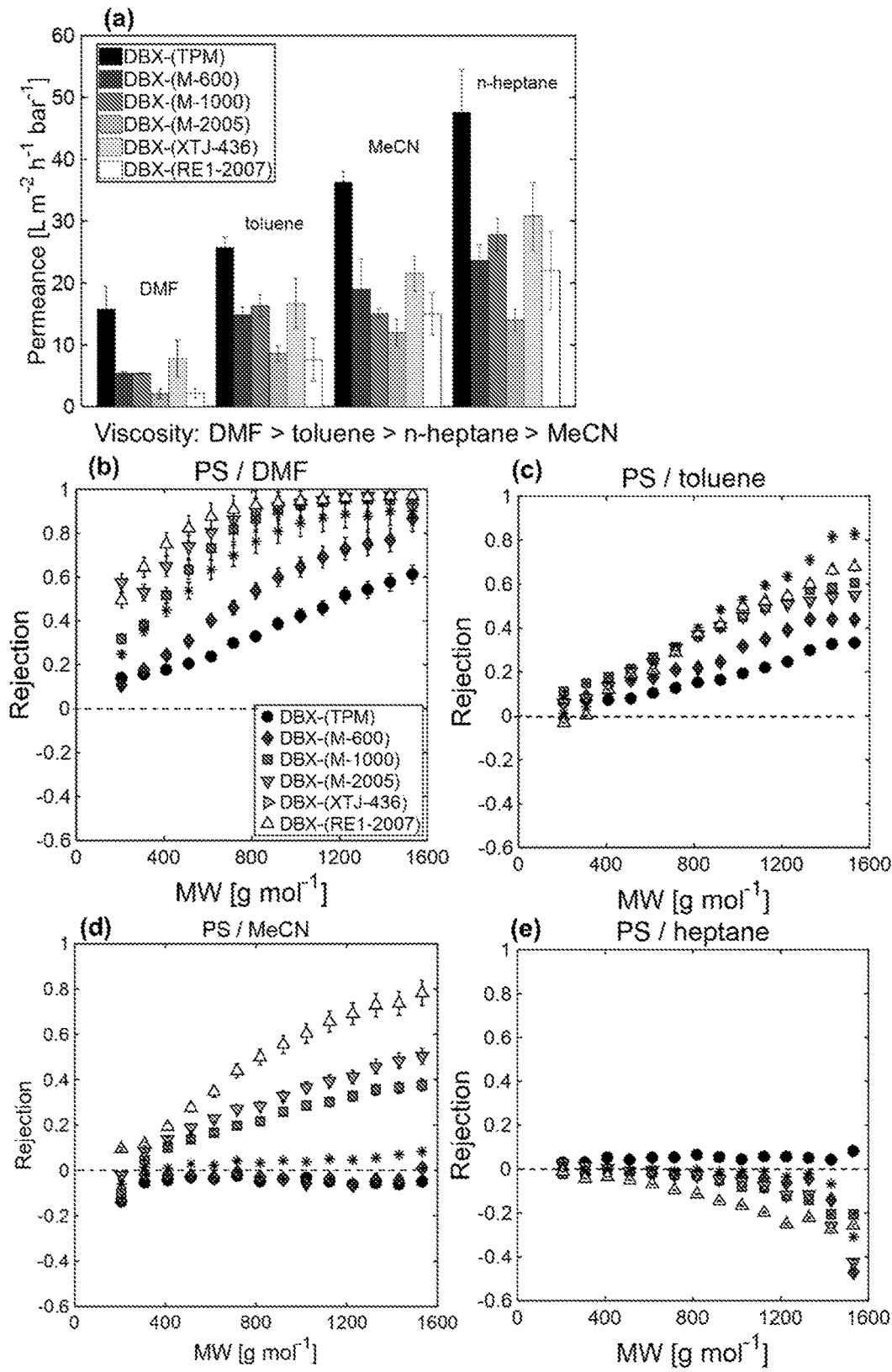
FIG. 13 shows permeance and PS rejection data of modified PBI membranes. (a) Permeance and trend with solvent viscosity; (b) Rejection of PS in DMF; (c) Rejection of PS in toluene; (d) Rejection of PS in MeCN; (e) Rejection of PS in n-heptane.

Effect of Type of Solvent and Type of Cross-Link Modification Agent on Membrane Performance The membranes were characterized with PEGs and PS as they are standard markers for organic solvent nanofiltration (OSN). Several solvents were chosen, which range from polar to apolar, to show the versatility of these membranes for different applications. Permeance and rejections of PEGs and PS are shown in FIGS. 12 and 13, respectively.

The permeance of the different solvents follows the order: TPM>>XTJ-436>M-600~/>M-1000~/>RE1-2007~/>M-2005 (see FIG. 12(a)). Rejection of PEG400 is similar for all membranes, while there is higher rejection of PEG2000 and PEG8000 for the membranes modified with Jeffamines/Elastamine with respect to those modified with TPM (see FIGS. 12 (b)-(d)). There is not a significant effect of the type of Jeffamine/Elastamine modifier on the PEG rejection. This could be attributed to the linear nature of PEG solutes and their tendency to align to the pore walls during permeation (thus reducing the effect of steric hindrance provided by the type of modifier).

With respect to polystyrene (PS), the permeance does not show a trend with the solvent viscosity (FIG. 13(a)). The membrane modified with TPM has the highest permeance for all solvents. The membranes modified with the two longest modifiers (M-2005 and RE1-2007) show the lowest permeance for all solvents. This could be explained as a steric effect. The longest modifiers give the highest PS rejection in DMF (FIG. 13(b)). In DMF, the effect of the modifier can be mostly explained as a steric contribution. In toluene, membranes have very poor selectivity, as clear from the flat rejection profile of FIG. 13(c). PS rejection in MeCN is affected by the type of modifier, as a consequence of both its length and its hydrophilic/phobic nature (FIG. 13(d)): higher rejection is obtained with longer and more hydrophilic modifiers: (RE1-2007>M-2005)>(M-1000>XTJ-436)>M-600. TPM-modified membrane has the lowest rejection in MeCN. In n-heptane rejection is zero for TPM-modified membranes, while is negative for Jeffamine/Elastamine-modified membranes (FIG. 13(e)). This could be attributed to a collapse of the Jeffamine/Elastamine modifiers against the pore walls, with a consequent effect on the hydrophilicity of the pore walls.

Effect of Type of Modifier on Oligonucleotide Separation

Figure 14:
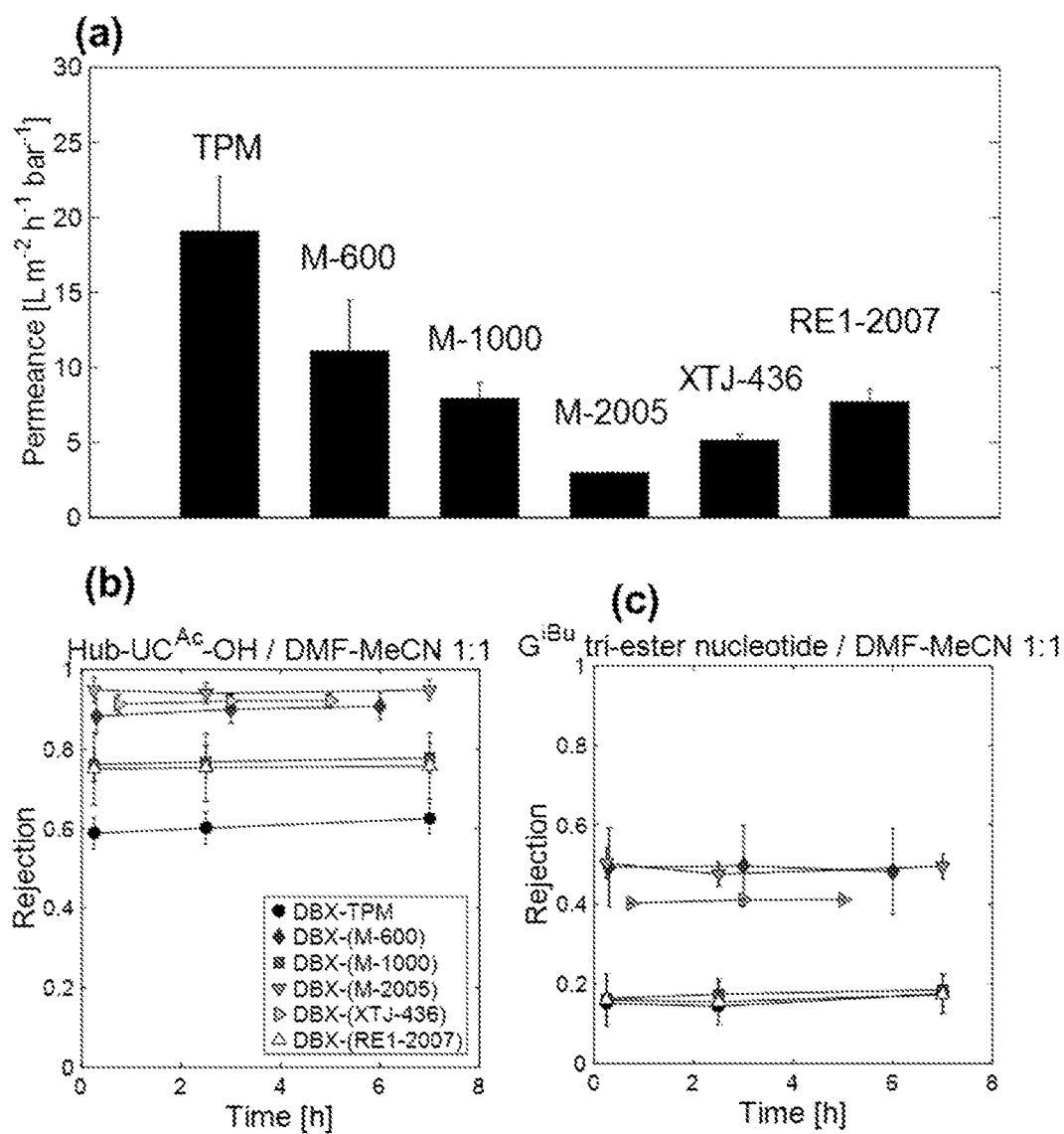
FIG. 14 shows permeance and rejection of modified PBI membranes. (a) Permeance; (b) Rejection of Hub-UC$^{Ac}$-OH in DMF-MeCN 1:1; (c) Rejection of G$^{iBu}$ tri-ester nucleotide in DMF-MeCN 1:1.

The hydrophilicity of the modifier has the strongest effect on both membrane permeance and solute rejection. Rejection of both Hub-UC$^{Ac}$-OH and guanosine tri-ester building block are higher in the presence of hydrophobic modifiers than hydrophilic modifiers (see FIGS. 14 (b) and (c)). TPM-modified membranes have the lowest rejection for both solutes. Permeance of DMF-MeCN 1:1 is lower with hydrophobic modifiers than with hydrophilic modifiers (see FIG. 14 (a)).

All references, including publications, patent applications, and patents, cited herein are hereby incorporated by reference in their entirety and to the same extent as if each reference were individually and specifically indicated to be incorporated by reference and were set forth in its entirety herein (to the maximum extent permitted by law).

All headings and sub-headings are used herein for convenience only and should not be construed as limiting the invention in any way.

The use of any and all examples, or exemplary language (e.g., "such as") provided herein, is intended merely to better illuminate the invention and does not pose a limitation on the scope of the invention unless otherwise paragraphed. No language in the specification should be construed as indicating any non-paragraphed element as essential to the practice of the invention.

The citation and incorporation of patent documents herein is done for convenience only and does not reflect any view of the validity, patentability, and/or enforceability of such patent documents.

This invention includes all modifications and equivalents of the subject matter recited in the paragraphs appended hereto as permitted by applicable law.

The invention claimed is:

1. A process for preparing an asymmetric integrally skinned membrane for the separation of at least one solute from a solution, comprising the steps of:
   (a) preparing a polybenzimidazole dope solution comprising:
      (i) a polybenzimidazole polymer, and
      (ii) a solvent system for said polybenzimidazole which is water miscible;
   (b) casting a film of said dope solution onto a support;
   (c) immersing the film cast on the support into a coagulating medium to form an asymmetric integrally skinned membrane;
   (d) treating the membrane from step (c) with a cross-linking agent, wherein the cross-linking agent is at least difunctionalised and comprises an electrophilic functional group; and
   (e) treating the membrane from step (d) with a cross-link modification agent, wherein the cross-link modification agent comprises a functional group capable of reacting with an electrophilic functional group on the cross-linking agent, the functional group being selected from an amine, a thiol, a thiolate, a phenoxide, a sulfonate, a phosphate, a phosphonate, a hydroxylamine, an oximate, a hydrazine, a hydrazone, an imide, and a hydrazide.

2. A process according to claim 1 wherein the polybenzimidazole polymer has the following general repeat structure I shown below:

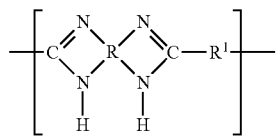

where R is a tetravalent aromatic nucleus, typically symmetrically substituted, with the nitrogen atoms forming the benzimidazole rings being paired upon adjacent carbon atoms of the aromatic nucleus, and $R^1$ is a divalent substituent selected from aliphatic, alicyclic and aromatic radicals.

3. A process according to claim 1 wherein the polybenzimidazole polymer has the following formula:

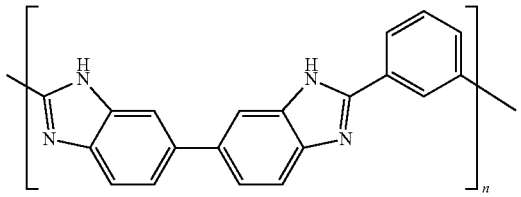

wherein n is an integer in the range of 10 to 5000.

4. A process according to claim 1, wherein the cross-linking agent is a multifunctional halide, multifunctional sulfonate ester or a divinyl sulfone.

5. A process according to claim 1, wherein the cross-linking agent is selected from dibromoxylene, dibromobutane, tribromopropane, trichloropropane, pentaerythrityl tetrabromide, pentaerythrityl tetrachloride, 1,3,5-tri(bromomethyl)benzene, 1,2,4,5-tetra(bromomethyl)benzene and divinyl sulfone.

6. A process according to claim 1, wherein the cross-link modification agent is an amine.

7. A process according to claim 1, wherein the cross-link modification agent is a polyetheramine.

8. An asymmetric integrally skinned membrane obtainable by the process according to claim 1.

9. A process according to claim 2 wherein the polybenzimidazole polymer has the following formula:

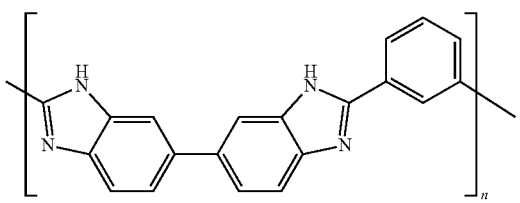

wherein n is an integer in the range of 10 to 5000.

10. A process according to claim 9, wherein the cross-linking agent is a multifunctional halide, multifunctional sulfonate ester or a divinyl sulfone.

11. A process according to claim 10, wherein the cross-link modification agent is an amine.

12. A process according to claim 10, wherein the cross-link modification agent is a polyetheramine.

13. An asymmetric integrally skinned membrane for the separation of at least one solute from a solution wherein the membrane comprises a cross-linked polybenzimidazole polymer cross-linked by a cross-linking agent, wherein the polymer comprises a cross-link modifier,
   wherein the cross-linking agent is at least difunctionalised and comprises an electrophilic functional group;
   wherein the cross-link modifier is a residue of a cross-link modification agent after it has reacted with an unreacted functional group of the cross-linking agent, wherein the cross-link modification agent comprises a functional group capable of reacting with an electrophilic functional group on the cross-linking agent, the functional group being selected from an amine, a thiol, a thiolate, a phenoxide, a sulfonate, a phosphate, a phosphonate, a hydroxylamine, an oximate, a hydrazine, a hydrazone, an imide, and a hydrazide.

14. A membrane according to claim 13 wherein the polybenzimidazole polymer has the following general repeat structure shown below:

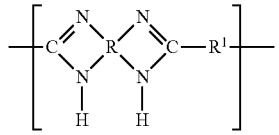

where R is a tetravalent aromatic nucleus, typically symmetrically substituted, with the nitrogen atoms forming the benzimidazole rings being paired upon adjacent carbon atoms of the aromatic nucleus, and $R^1$ is a divalent substituent selected from aliphatic, alicyclic and aromatic radicals.

15. A membrane according to claim 13, wherein the cross-link modifier is the residue of a cross-link modification agent comprising an amine functional group.

* * * * *